(12) United States Patent
Ong

(10) Patent No.: US 8,194,200 B2
(45) Date of Patent: Jun. 5, 2012

(54) LOW COST SWITCHING ELEMENT POINT INVERSION DRIVING SCHEME FOR LIQUID CRYSTAL DISPLAYS

(75) Inventor: Hiap L. Ong, Diamond Bar, CA (US)

(73) Assignees: Hiap L. Ong (TW); Kyoritsu Optronics, Co., Ltd (TW)

( * ) Notice: Subject to any disclaimer, the term of this patent is extended or adjusted under 35 U.S.C. 154(b) by 1269 days.

(21) Appl. No.: 11/751,469

(22) Filed: May 21, 2007

(65) Prior Publication Data

US 2008/0007664 A1 Jan. 10, 2008

Related U.S. Application Data

(63) Continuation-in-part of application No. 11/227,595, filed on Sep. 15, 2005, now Pat. No. 7,630,033.

(60) Provisional application No. 60/779,815, filed on May 22, 2006, provisional application No. 60/779,843, filed on May 22, 2006.

(51) Int. Cl.
*G02F 1/136* (2006.01)

(52) U.S. Cl. .......................................... 349/48; 349/108
(58) Field of Classification Search .................. 349/106, 349/144, 146, 108, 43, 42, 48
See application file for complete search history.

(56) References Cited

U.S. PATENT DOCUMENTS 4,969,718 A * 11/1990 Noguchi et al. ............... 349/144
5,485,293 A * 1/1996 Robinder ......................... 345/88
* cited by examiner

*Primary Examiner* — Thoi Duong
(74) *Attorney, Agent, or Firm* — Silicon Valley Patent Group, LLC; Edward S. Mao

(57) ABSTRACT

Displays using a low cost method to implement switching element point inversion driving schemes while using integrated circuits that are designed to implement switching element row inversion or switching element column driving schemes are described. In one display, a first color dot is on a first side of a control line and a second color dot is on a second side of the control line. A first switching element is coupled to the first control line and the first color dot and a second switching element is coupled to the second color dot and the control line. Thus the control line controls color dots on two different rows or two different columns.

14 Claims, 26 Drawing Sheets

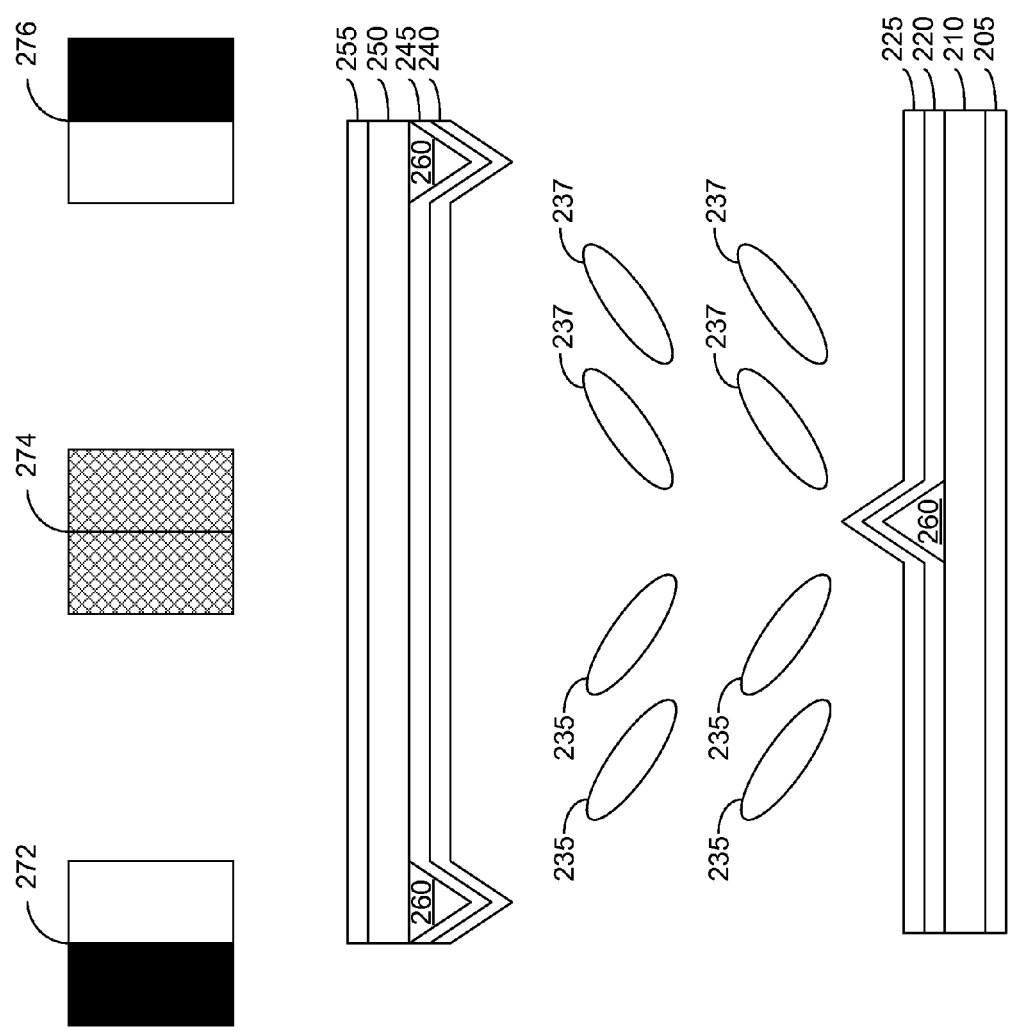

LOW COST SWITCHING ELEMENT POINT INVERSION DRIVING SCHEME FOR LIQUID CRYSTAL DISPLAYS

RELATED APPLICATIONS

The present application is a Continuation-In-Part of and claims the benefit of U.S. Utility patent application Ser. No. 11/227,595 (Publication number US 2007/0058122 A1), entitled "Large Pixel multi-domain vertical alignment liquid crystal display using fringe fields", by Hiap L. Ong, filed Sep. 15, 2005, and is incorporated herein in its entirety by reference.

The present application also claims the benefit of U.S. Provisional Patent Application Ser. No. 60/799,815, entitled "Multi-domain Vertical Alignment liquid crystal display with row inversion drive scheme", by Hiap L. Ong, filed May 22, 2006, and is incorporated herein in its entirety by reference.

The present application also claims the benefit of U.S. Provisional Patent Application Ser. No. 60/799,843, entitled "Method To Conversion of Row Inversion To Have Effective Pixel Inversion Drive Scheme", by Hiap L. Ong, filed May 22, 2006, and is incorporated herein in its entirety by reference.

BACKGROUND OF THE INVENTION

1. Field of the Invention

The present invention relates to liquid crystal displays (LCDs). More specifically, the present invention relates driving schemes for liquid crystal displays.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawbacks of conventional twisted nematic LCDs are narrow viewing angle and low contrast ratio. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 10 million liquid crystal molecules in a pixel that is 100 μm width by 300 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100; therefore, LCD 100 gives a completely optical black state and a very high contrast ratio for all color and all cell gaps. Consequently MVA LCDs provide a big improvement on the contrast ratio over the conventional low contrast twisted nematic LCDs. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 100 is not uniform to viewers at different viewing angles. As illustrated in FIG. 1(c), a viewer 210 that is left of center would see a bright pixel because the broad (light rotating) side of liquid crystals 130 faces viewer 210. A viewer 220 that is centered on the pixel would see a gray pixel because the broad side of liquid crystals 130 is only partially facing viewer 220. A viewer 230 that is right of center would see a dark pixel because the broad side of liquid crystals 130 is barely facing viewer 230.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that a pixel is divided into 4 domains to provide wide symmetrical viewing angles both vertically and horizontally. Other methods to create MVA LCDs also exist, for example an MVA LCD without protrusions is described in U.S. Utility patent application Ser. No. 11/227,595 (Publication number US 2007/0058122 A1) entitled "Large pixel multi-domain vertical alignment liquid crystal display using fringe field" by Hiap L. Ong. Thus, multi-domain vertical alignment liquid crystal displays, provide high contrast ratio and wide symmetrical viewing angles.

FIG. 3 shows a perspective view of a portion of an LCD 300. LCD 300 includes a first polarizer 302 attached to a substrate 305. The portion illustrated in FIG. 3 shows three pixels P(0, 0), P(0, 1) and P(0, 2). Each pixel includes three color dots CD_1, CD_2, and CD_3. A color mask (not shown) is used to create a color display. For example, the color mask could have a red window for color dot CD_1, a green window for color dot CD_2, and a blue window for color dot CD_3. FIG. 3 illustrates the electrodes for the color dots but for consistency the electrodes are also labeled using CD_1, CD_2, and CD_3. The electrodes of color dots are formed on the top surface of substrate 305. An alignment layer (not shown) would cover the electrodes. Also shown in FIG. 3 are switching elements for each color dot. Specifically, SE1, SE2, and SE3 are used with color dots CD_1, CD_2, and CD_3, respectively for each pixel. The switching elements can be n-channel Field Effect Transistors fabricated using thin film technology.

The switching elements are powered by two types of control lines; specifically, gate lines (G0, G1 and G2) and source lines (S0_1, S0_2, and S0_3). Specifically for pixel P(0, 0), the gate terminals of switching elements SE1, SE2, and SE3 are coupled to gate line G0. The source terminals of switching elements SE1, SE2, and SE3 are coupled to source lines S0_1, S0_2, and S0_3, respectively. The drain terminals of switching elements SE1, SE2, and SE3 are coupled to the electrodes of color dots CD_1, CD_2, and CD_3, respectively, of pixel P(0, 0). In general the for pixel P(x, y), the gate terminals of switching elements SE1, SE2, and SE3 are coupled to gate line GY and the source terminals of switching element SE1, SE2, and SE3 are coupled to source lines SX_1, SX_2, and SX_3, respectively. Typically, gate lines controlled by integrated circuits commonly called "row drivers" and source lines are controlled by integrated circuits commonly called "column drivers". Additional integrated circuits are also used to control polarity as described below. FIG. 4(a) (described below) illustrates in more detail the use of the control lines, i.e. source lines and gate lines, in a display 400. The electrical connections are typically made using a transparent conductor such as ITO. An alignment layer (not shown) would cover the electrodes. Although not shown in FIG. 3, some displays may also include additional storage capacitors coupled to the electrodes of the color dots to maintain proper charge levels.

FIG. 4(a) illustrates a small portion (6 pixels) of a display 400. Specifically, FIG. 4(a) illustrates pixels P(0, 1), P(0, 2), P(0, 3), P(1, 0), P(1, 1), P(1, 2) and P(1, 3). Each pixel includes three color dots (CD_1, CD_2, and CD_3) and three transistors. FIG. 4(a) also includes source lines (S0_1, S0_2, S0_3, S1_1, S1_2, and S1_3,) and gate lines (G0, G1, G2, and G3). In general, a source line SX_Z and gate line GY is used for color dot CD_Z of pixel P(X, Y) (i.e. Xth pixel on row Y). The source terminal of a transistor is coupled to a source line; the gate terminal of the transistor is coupled to a gate line; and the drain terminal of the transistor is coupled to the electrode of a color dot. For clarity, transistors are labeled and referenced as transistor T(X, Y, Z), such that the source terminal of transistor T(X, Y, Z) is coupled to source line SX_Z and the gate terminal of transistor T(X, Y, Z) is coupled to gate line GZ. In display 400, the drain terminal of transistor T(X, Y, Z) is coupled to color dot CD_Z of pixel P(X, Y). Thus for example, Pixel P(0, 1) includes three color dots CD_1, CD_2, and CD_3, which are coupled to transistors T(0, 1, 1), T(0, 1, 2), T(0, 1, 3), respectively. The gate terminals of transistors T(0, 1, 1), T(0, 1, 2), T(0, 1, 3) are coupled to gate line G1; the source terminals of transistors T(0, 1, 1), T(0, 1, 2), T(0, 1, 3) are coupled to source lines S0_1, S0_2, S0_3, respectively; and the drain terminals of transistors T(0, 1, 1), T(0, 1, 2), T(0, 1, 3) are coupled to color dots CD_1, CD_2, and CD_3, respectively, of pixel P(0, 1). For clarity, the area of each pixel is shaded; this shading is only for illustrative purposes in FIG. 4(a) and has no functional significance.

Each Gate line extends from the left side of display 400 to the right side and controls all the pixels on one row of display 400. Display 400 has one gate line for each row of pixels. Each source line runs from the top to the bottom of display 400. Display 400 has three times the number of source lines as the number of pixels on each row (i.e. one source line for each color dot of each pixel). During operation only one gate line is active at a time. For conventional amorphous silicon NMOS TFTs, the NMOS transistors are active when the gate terminal is pulled high. All transistors in the active row are rendered conductive by a positive gate impulse from the active gate line. Transistors in other rows are blocked by negative level of voltage applied on the non-active gate lines. In some applications, transistors in other rows are blocked by grounding the non-active gate lines. For single crystalline silicon PMOS TFTs, the PMOS TFTs are active when the gate terminal is pulled low. All source lines are active at the same time and each source line provides display data to one transistor on the active row (as controlled by the active gate line). Therefore, gate lines are often called bus lines and source lines are often called data lines due to the way the gate lines and source lines operate. The voltage charges the liquid crystal capacitor to a desired gray scale level (color is provided by color filter layers). When inactive, the electrodes of the color dot are electrically isolated and thus can maintain the field to control the liquid crystals. However, parasitic leakage is unavoidable and eventually the charge will dissipate. For small screens with fewer rows, the leakage is not problematic because the row is "refreshed" quite often. However, for larger displays with more rows there is a longer period between refreshes. Thus, some displays include one or more storage capacitor for each color dot. The storage capacitors are charged with the electrode of the color dot and provide a "maintenance" charge while the row is inactive. Generally, the data lines and bus lines are manufactured using an opaque conductor, such as Aluminum (Al) or Chromium (Cr).

The electrodes in a liquid crystal display can have a positive or negative polarity. Between successive frames the electrodes switch polarity to prevent image quality degradation, which may result from migration of mobile ions. Two common ways of controlling polarity are constant V-com (DC V-com) and V-com Modulation (AC V-com), where V-com is the common reference voltage for the transistors. In constant V-com, the signals on the source line drivers not only control the brightness of the color dot but also directly control the polarity as well. Common reference V-com is a constant and does not change. With V-com modulation, common reference V-com varies periodically in time and is supplied by a V-com reference circuit. The data on the source line only controls the brightness of the color dot. Additional circuitry (not shown) is used to control the polarity. Generally, control timing and voltages are applied to a backplane to change the polarity. With V-com modulation the voltage range used on the source lines can be less than constant V-com drive systems while still having the same applied effective voltage on the liquid crystal, i.e., on the color dots.

The polarity switching may cause other image quality issues such as flicker if all the switching elements are of the same polarity. Spatial averaging is used to reduce flicker. Specifically, switching elements (e.g. transistors) are arranged in switching element driving scheme that include positive and negative polarities. Furthermore, to minimize cross talk the positive and negative polarities of the switching elements should be arranged in a uniform pattern, which also provides a more uniform power distribution. When the columns have the opposing polarity, the current in the columns effectively cancel out, which eliminates the cross talk component.

Various switching element driving schemes are used. The three main switching element driving schemes are switching element point inversion driving scheme, switching element row inversion driving scheme, and switching element column inversion driving scheme. FIGS. 4(b)-4(d) illustrate different switching element driving schemes using "+" for positive polarity and "−" for negative polarity within the electrodes of the color dots. In the switching element point inversion driving scheme, the switching elements form a checkerboard pattern of alternating polarities. FIG. 4(b) illustrates the switching element point inversion driving scheme with a display 410 having the same basic layout as display 400. Specifically in FIG. 4(b), a color dot CD_Z of pixel P(X, Y) has positive polarity if X plus Y plus Z is an odd number and has negative polarity if X plus Y plus Z is an even number. However in the next frame the polarities switch so that each color dot would have the opposite polarity.

In the switching element row inversion driving scheme, the switching elements on each row have the same polarity; however, each switching element in one row has the opposite polarity as compared to the polarity of switching elements in adjacent rows. FIG. 4(c) illustrates the switching element row inversion driving scheme using display 420 having the same basic layout as display 400. Specifically in FIG. 4(c), a color dot CD_Z of pixel P(X,Y) has positive polarity if Y is an even number and has negative polarity if Y is an odd number. However, in the next frame the polarities switch so that each color dot would have the opposite polarity.

In the switching element column inversion driving scheme, the switching elements on each column have the same polarity; however, a switching element in one column has the opposite polarity as compared to the polarity of switching elements in adjacent columns. FIG. 4(d) illustrates the switching element column inversion driving scheme using a display 440 having the same basic layout as display 400. Specifically in FIG. 4(d), a color dot CD_Z of pixel P(X, Y) has positive polarity if X plus Z is an odd number and negative polarity if X plus Z is an even number. However, in the next frame the polarities switch so that each color dot would have the opposite polarity.

Although displays 410, 420, and 430 have the same basic layout, the driving scheme differ greatly and the driving circuits are also very different. With switching element row inversion driving scheme, vertical cross talk is reduced. Conversely, with switching element column inversion driving scheme horizontal cross talk is reduced. Furthermore, flicker is reduced due to spatial averaging in both switching element column inversion and switching element row inversion driving schemes. Switching element point inversion driving scheme provides the best image quality due to reduction of both horizontal and vertical cross talk. Furthermore, flicker reduction is greater due to better spatial averaging as compared to switching element row inversion or switching element column inversion driving scheme.

However, switching element point inversion is less energy efficient and more costly and more difficult to implement as compared to switching element row inversion driving schemes. Specifically, switching element point inversion is not compatible with V-com modulation. Therefore, conventional switching element point inversion driving schemes use constant V-com drive systems and require high voltage source driver and higher power because of the line inversion component. Switching element row inversion driving schemes can be used with V-com modulation and thus can operate at lower voltages and have lower power consumption than switching element point inversion driving schemes. Furthermore, integrated circuits implementing switching element point inversion driving schemes require a high voltage (12 volts) fabrication process, which is more costly than lower voltage (5 volt) process that can be used with integrated circuits implementing switching element row inversion driving schemes. In addition the die size of integrated circuits implementing switching element point inversion driving schemes is larger than the die size of integrated circuits implementing switching element row inversion driving schemes. Thus, using switching element point inversion driving scheme is more costly in terms if manufacturing as well as power consumption than using switching element row inversion driving scheme. However, image quality is improved by using switching element point inversion driving schemes. Hence, there is a need for a method or system that can provide the image quality of switching element point inversion driving schemes without large manufacturing cost and power consumption of conventional switching element point inversion driving schemes.

SUMMARY

Accordingly, the present invention provides low cost methods to implement switching element point inversion driving scheme using integrated circuits that are designed to implement switching element row inversion or switching element column inversion driving schemes. Generally, the present invention allows control lines to control color components on multiple rows or columns. Furthermore, the present invention includes novel driving schemes using delayed source lines or shifted source lines to improve color alignment.

A liquid crystal display in accordance with one embodiment of the present invention includes a first control line, a first color dot on a first side of the first control line, and a second color dot on a second side of the control line. A first switching element is coupled to the first control line and is coupled to and controls the first color dot. A second switching element is also coupled to the first control line and is coupled to and controls the second color dot. A second control line is coupled to the first switching element and a third control line is coupled to the second switching element. Thus the first control line is coupled to color dots in different rows or different columns.

In some embodiments of the present invention include novel driving scheme is the displays having a data control system. In one embodiment the data control system provides source data and delayed source data. The delayed source data are applied to a subset of the source lines while the source data is applied to the rest of the source lines. In another embodiment of the present invention, the data control system provides shifted source data and normal source data. For shifted source data, the source data is shifted to an adjacent source line. The novel driving schemes are used to realign color components in some embodiments of the present invention.

The present invention will be more fully understood in view of the following description and drawings.

BRIEF DESCRIPTION OF THE DRAWINGS

FIG. 2 is an illustration of a pixel of a conventional multi-domain vertical alignment LCD.

DETAILED DESCRIPTION

As explained above, in general conventional LCDs using switching element point inversion driving schemes provide better image quality than LCDS using switching element row inversion driving schemes. However, LCDs using switching element point inversion driving schemes are more expensive to manufacture and consume more energy than LCDs using switching element row inversion driving schemes. Using the principles of the present invention, novel switching element point inversion driving schemes can be achieved using lower cost and lower power column drivers used in switching element row inversion driving schemes.

Figure 1B:
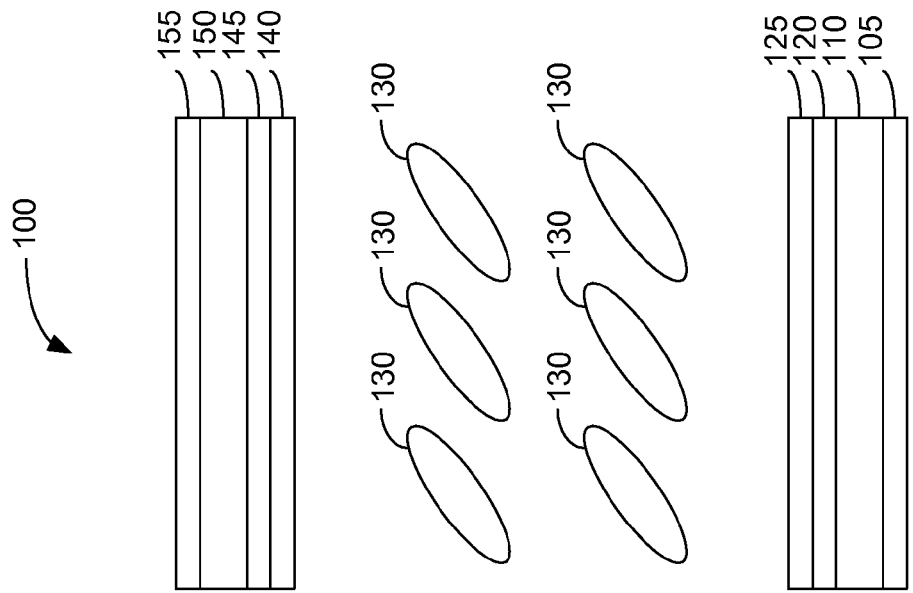
FIGS. 1(a)-1(c) are three illustrations of a pixel of a conventional single domain vertical alignment LCD.
Figure 1A:
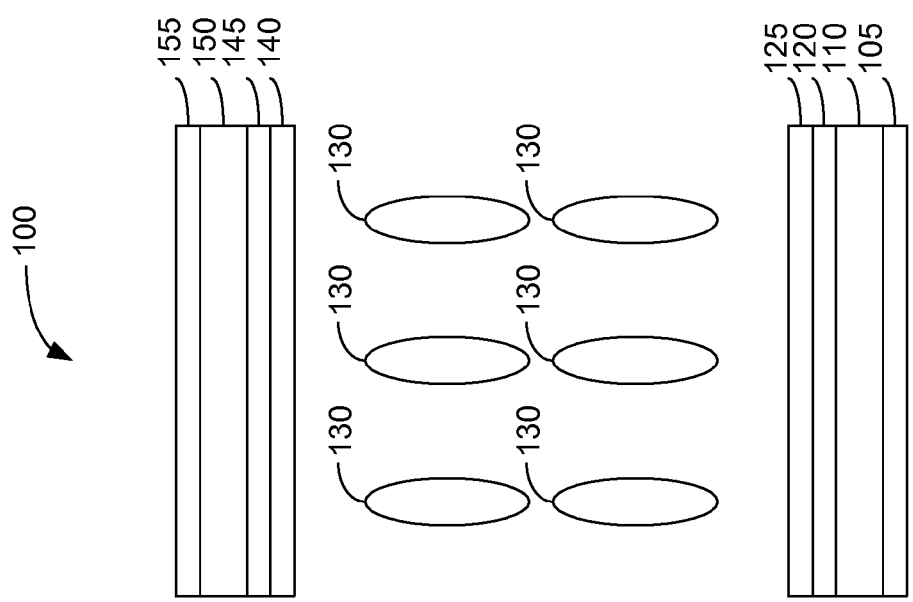
Figure 1C:
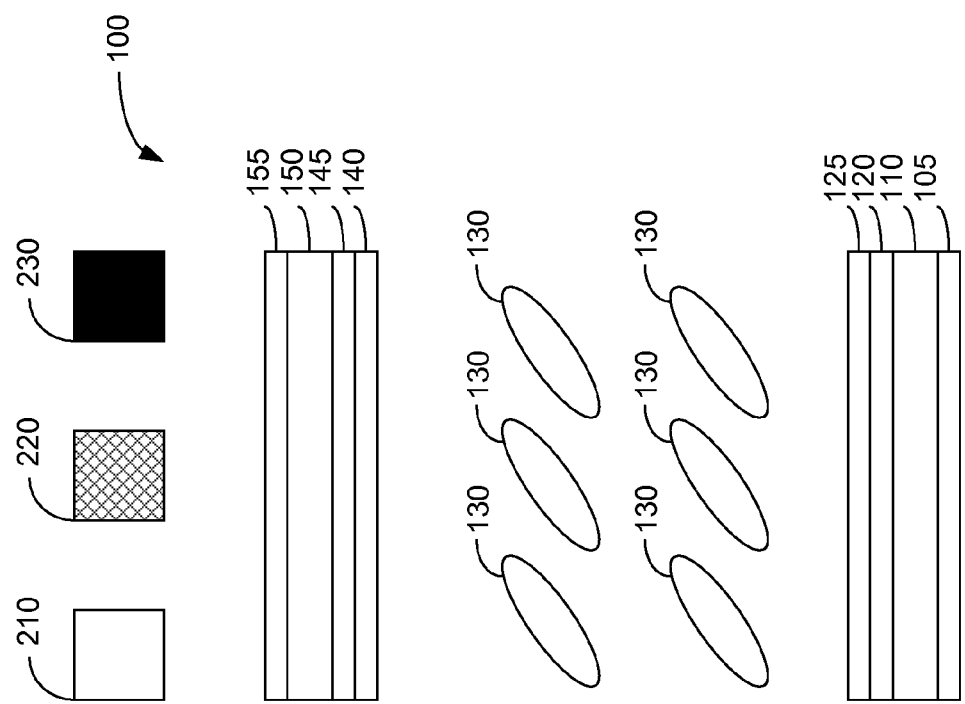
Figure 3:
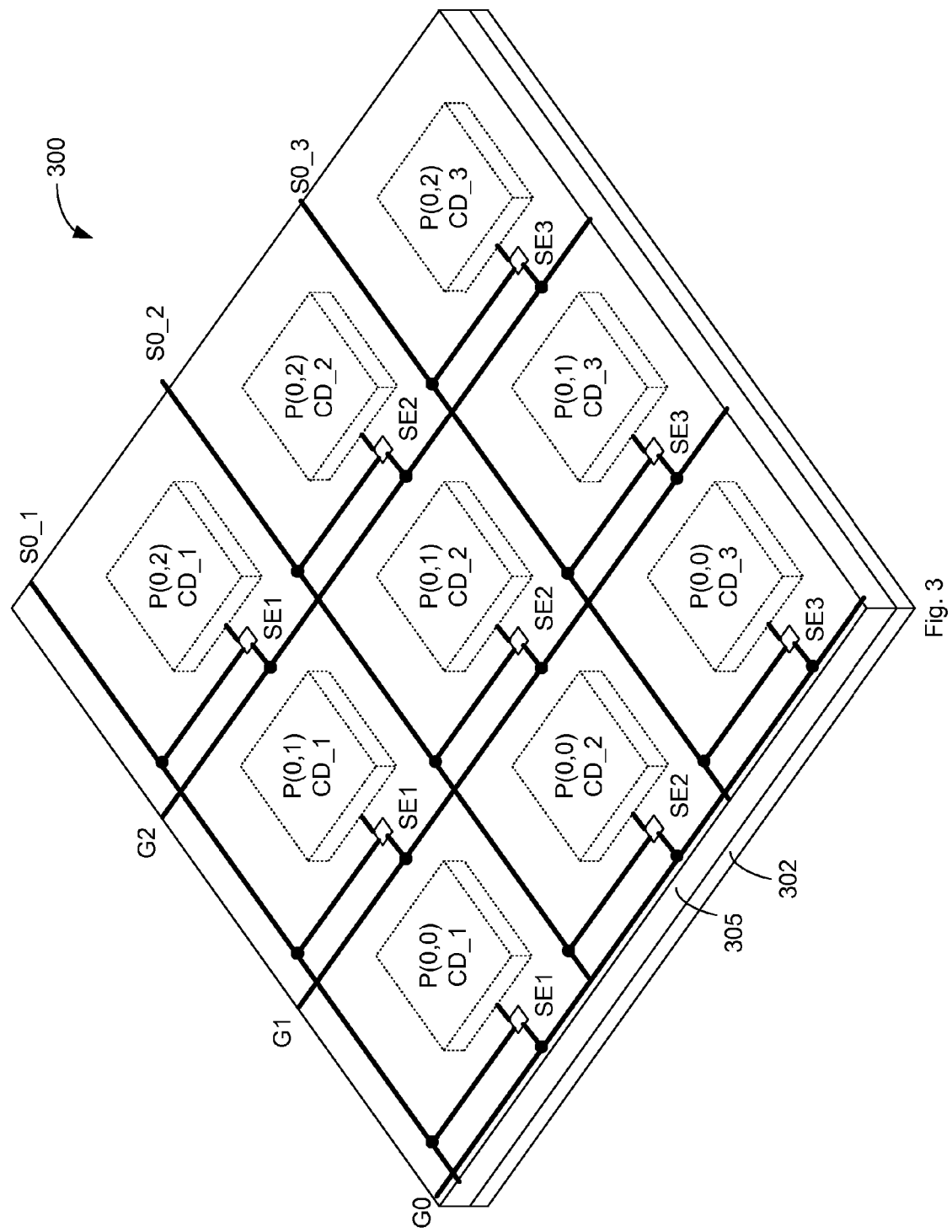
FIG. 3 is a perspective view of an LCD display.
Figure 4A:
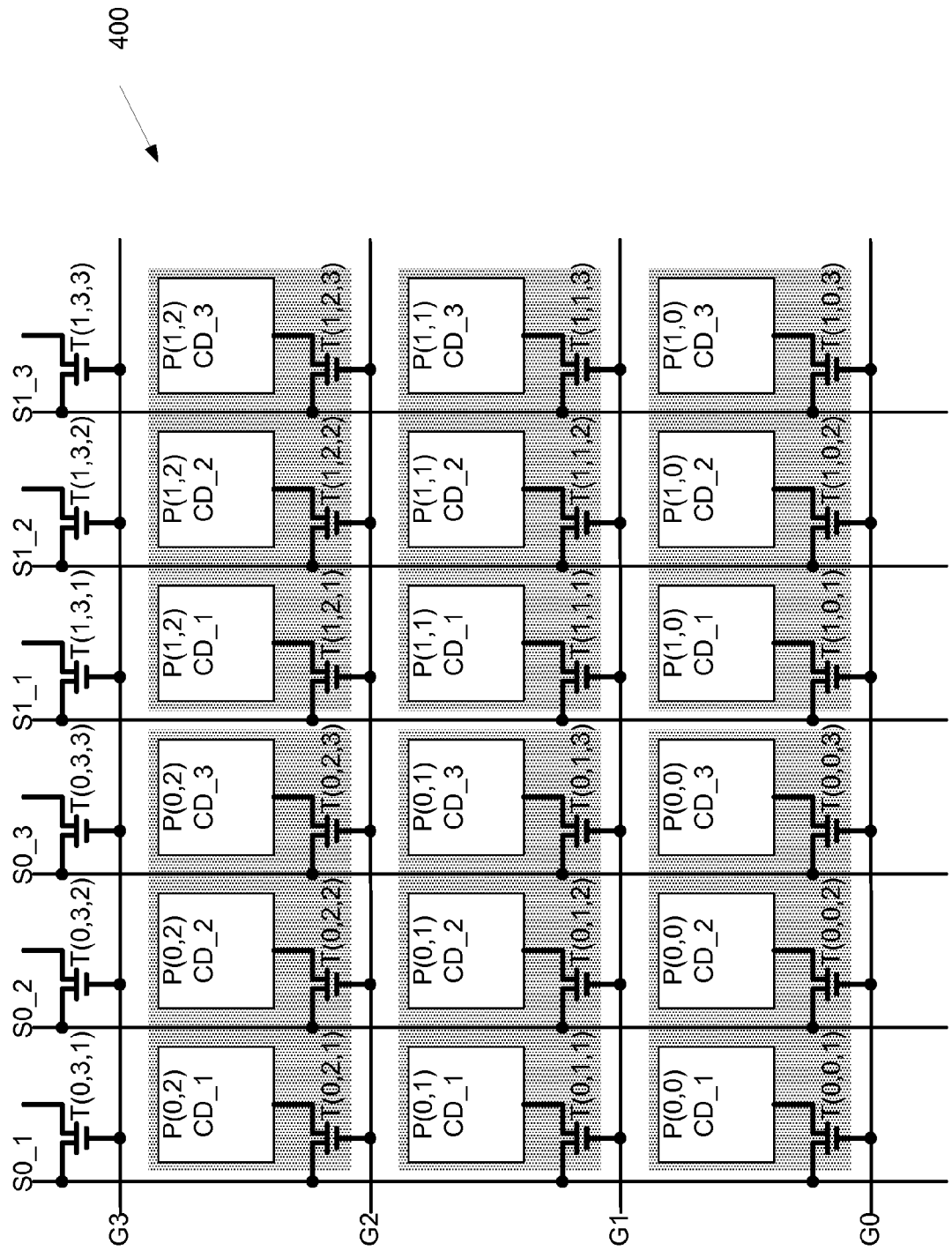
FIGS. 4(a)-4(d) illustrate various switching element inversion schemes in conventional displays.
Figure 4B:
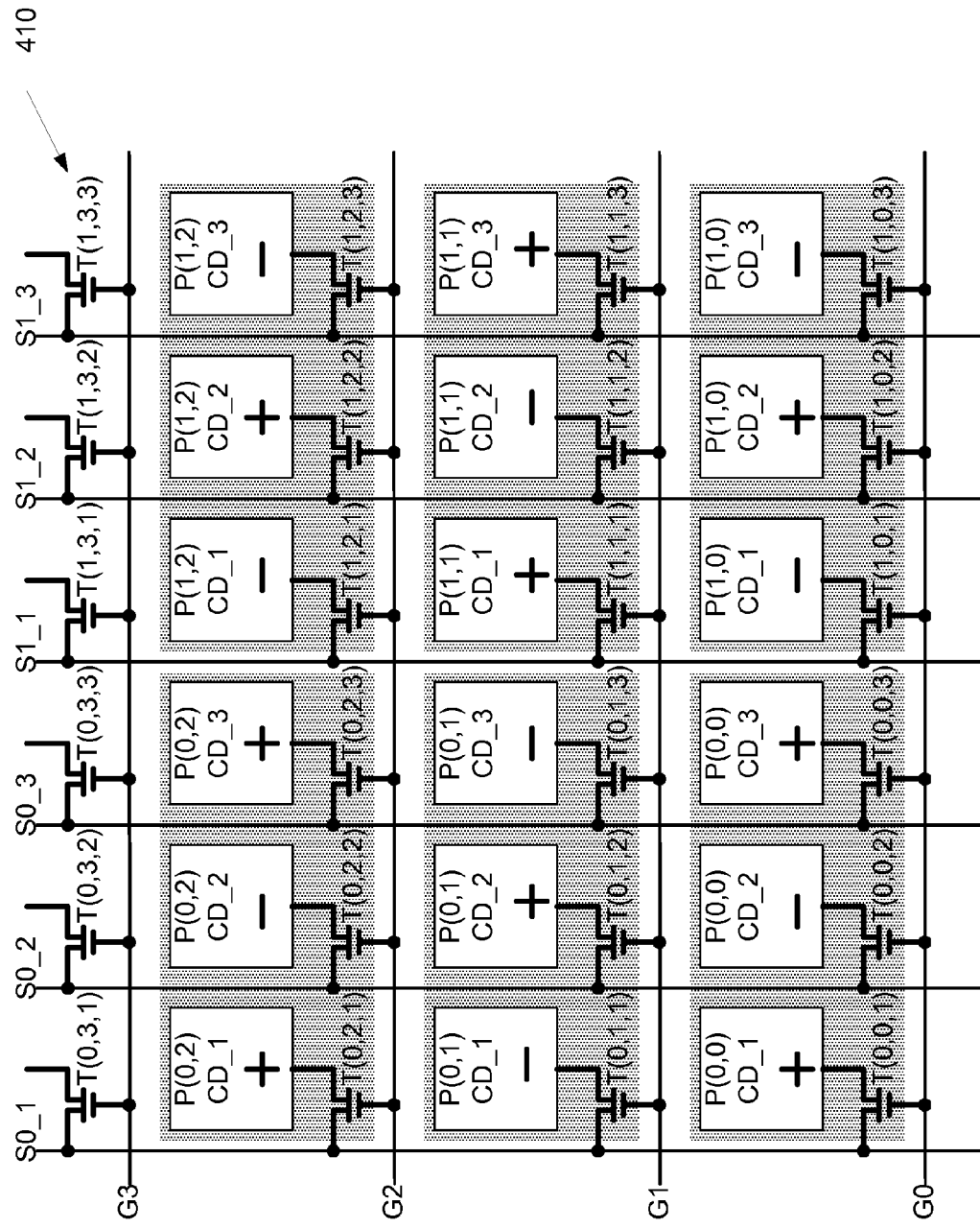
Figure 4C:
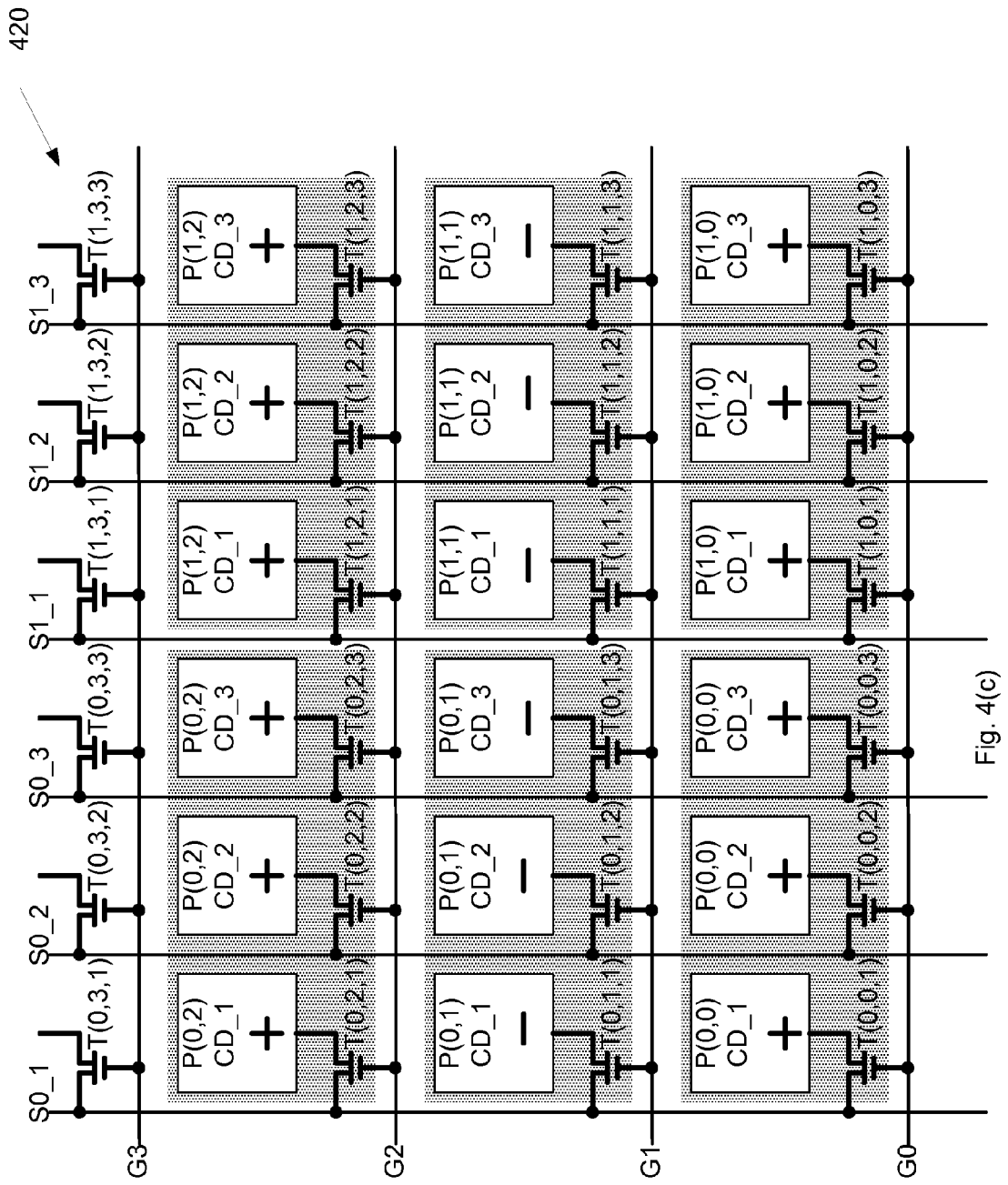
Figure 4D:
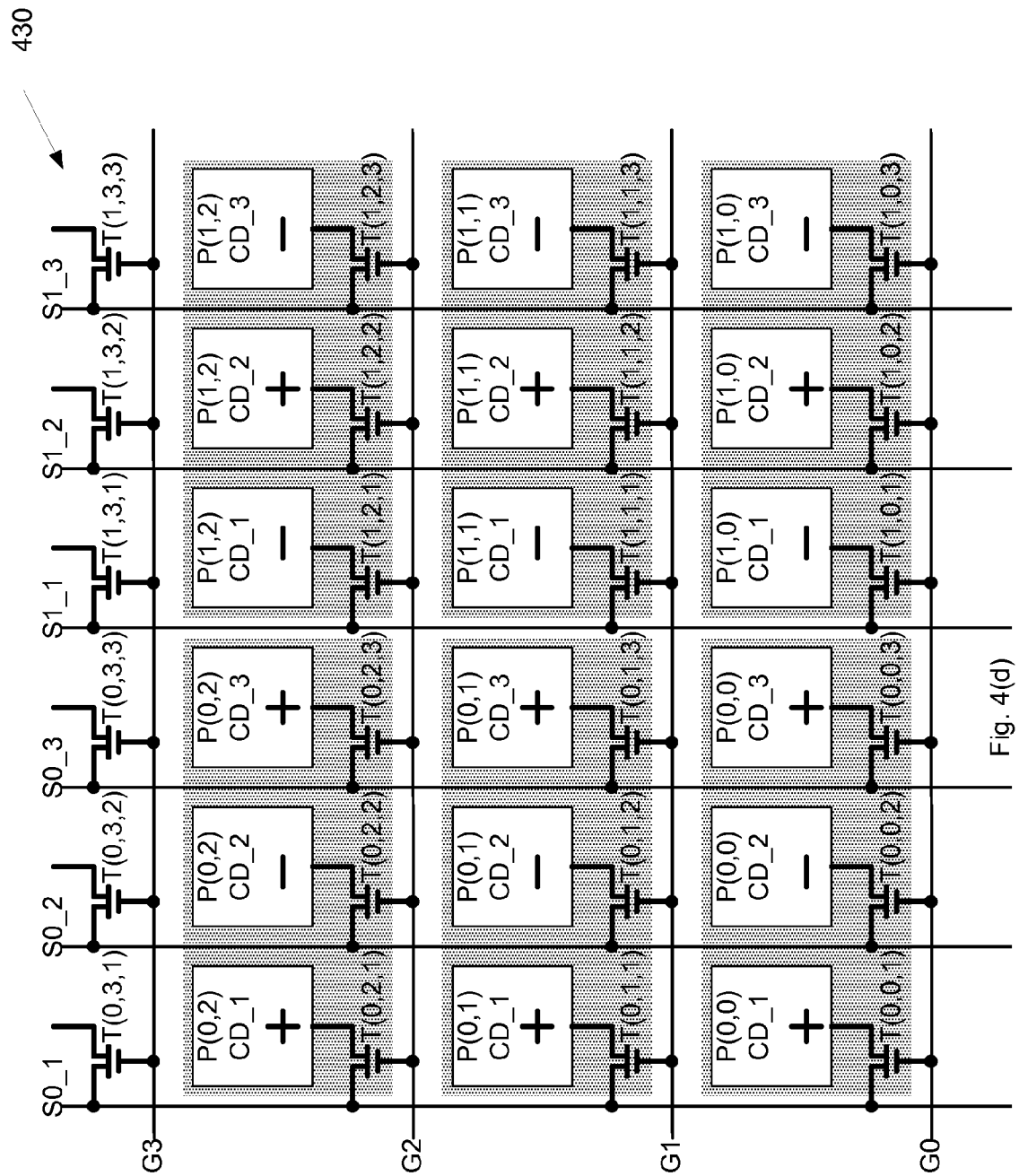
Figure 5:
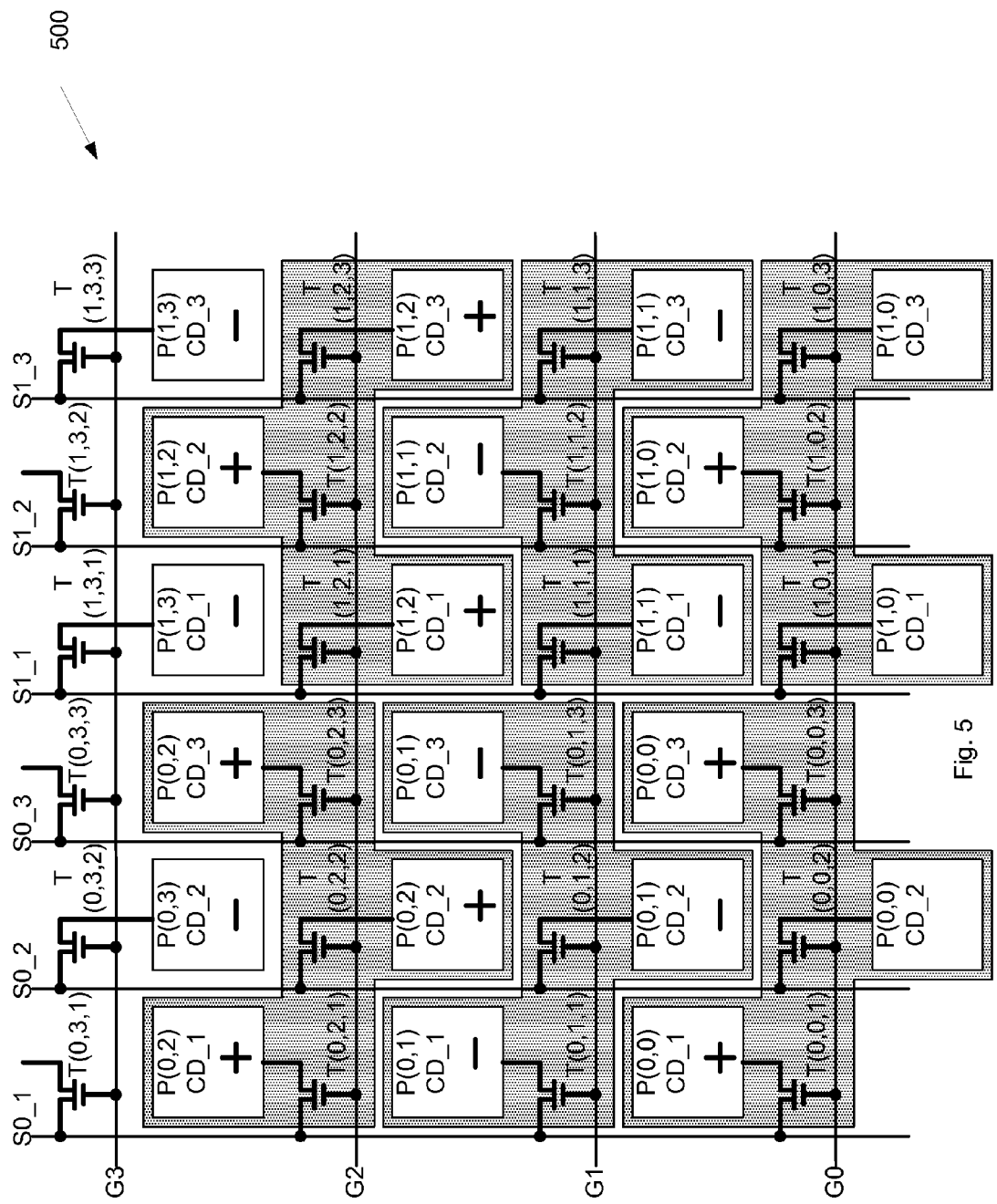
FIG. 5 is an illustration of a display in accordance with an embodiment of the present invention.

In switching element row inversion driving schemes, the polarities of the transistors on the same gate line are the same (See FIG. 4(c)). In accordance with one embodiment of the present invention, transistors on the same gate line control color dots on multiple rows. FIG. 5 illustrates a small portion (6 pixels) of a display 500 in accordance with one embodiment of the present invention. Specifically, FIG. 5 illustrates pixels P(0, 1), P(0, 2), P(0, 3), P(1, 0), P(1, 1), P(1, 2) and P(1, 3). Each pixel includes three color dots (CD_1, CD_2, and CD_3) and three transistors. FIG. 5 also includes source lines (S0_1, S0_2, S0_3, S1_1, S1_2, and S1_3,) and gate lines (G0, G1, G2, and G3). Each Gate line extends from the left side of display 500 to the right side and controls all the pixels on one row of display 500. Unlike displays 400-430 (FIGS. 4(a)-4(d)), which has one gate line for each row of color dots, in display 500, a gate line can control color dots on more than one row as explained below. Each source line runs from the top to the bottom of display 500. Display 500 has three times the number of source lines as the number of pixels on each row (i.e. one source line for each color dot of each pixel). During operation only one gate line is active at a time. All transistors in the active row are rendered conductive by a positive gate impulse from the active gate line. Transistors in other rows are blocked by negative level of voltage applied on the non-active gate lines. All source lines are active at the same time and each source line provides display data to one transistor on the active row (as controlled by the active gate line). Therefore, gate lines are often called bus lines and source lines are often called data lines due to the way the gate lines and source lines operate. The voltage charges the liquid crystal capacitor to a desired gray scale level (color is provided by color masks). When inactive, the electrodes of the color dot are electrically isolated and thus can maintain the field to control the liquid crystals. However, parasitic leakage is unavoidable and eventually the charge will dissipate. For small screens with fewer rows, the leakage is not problematic because the row is "refreshed" quite often. However, for larger displays with more rows the there is a longer period between refreshes. Thus, some displays include one or more storage capacitor for each color dot. The storage capacitors are charged with the electrode of the color dot and provide a "maintenance" charge while the row is inactive.

In display 500, the source terminal of a transistor is coupled to a source line; the gate terminal of the transistor is coupled to a gate line; and the drain terminal of the transistor is coupled to the electrode of a color dot. For clarity, transistors are labeled and referenced as transistor T(X, Y, Z), such that the source terminal of transistor T(X, Y, Z) is coupled to source line SX_Z and the gate terminal of transistor T(X,Y,Z) is coupled to gate line GY. The primary difference between display 500 and displays 400-430 is that transistors coupled to the same gate line control color dots on different rows in display 500. Thus for example transistor T(0, 1, 1) controls a color dot on the row of color dots above gate line G1 and transistor T(0, 1, 2) controls a color dot on the row of color dots below gate line G1. In general for display 500, a transistor T(X,Y,Z) controls the color dot above transistor T(X,Y,Z) when X plus Y plus Z is an even number and controls the color dot below transistor T(X, Y, Z) when X plus Y plus Z is an even odd. Thus when gate line G1 is active, every other color dot on the row of color dots above gate line G1 beginning with the first color dot and every other color dot on the row of color dot below gate line G1 beginning with the second color dot are active. As explained above, when using switching element row inversion drivers, all of the color dots controlled by transistors coupled to the same gate line have the same polarity. Thus as shown in FIG. 5, the overall polarity pattern of the color dots in FIG. 5 is the same as a display using switching element point inversion driving scheme (See FIG. 4(b)).

Due to the change in the connection of the transistors in display 500, pixels in display 500 are shaped differently than in displays 400-430. For clarity, the area of each pixel in display 500 is shaded; this shading is only for illustrative purposes in FIG. 5 and has no functional significance. In display 500 Pixel P(0, 1) includes three color dots CD_1, CD_2, and CD_3, which are coupled to transistors T(0, 1, 1), T(0, 1, 2), T(0, 1, 3), respectively. However, color dot CD_2 of pixel P(0,1) is on a different row than color dots CD_1 and CD_3 of pixel P(0, 1). Specifically, the gate terminals of transistors T(0, 1, 1), T(0, 1, 2), and T(0, 1, 3) are coupled to gate line G1. The source terminals of transistors T(0, 1, 1), T(0,1,2), and T(0, 1, 3) are coupled to source lines S01, S0_2, and S0_3, respectively. The drain terminal of transistors T(0, 1, 1), T(0, 1, 2), and T(0, 1, 3) are coupled to color dots CD_1, CD_2, and CD_3 of pixel P(0, 1), respectively. However, color dot CD_1 and CD_3 of pixel P(0, 1) are on the row of color dots above gate line G1 while color dot CD_2 of pixel P(0, 1) is on the row of color dots below gate line G1. In display 500, pixel P(1, 1) includes three color dots CD_1, CD_2, and CD_3, which are coupled to transistors T(1, 1, 1), T(1, 1, 2), T(1, 1, 3), respectively. However, color dot CD_2 of pixel P(1, 1) is on a different row than color dots CD_1 and CD_3 of pixel P(1, 1). Specifically, the gate terminals of transistors T(1, 1, 1), T(1, 1, 2), and T(1, 1, 3) are coupled to gate line G1. The source terminals of transistors T(1, 1, 1), T(1, 1, 2), and T(1, 1, 3) are coupled to source lines S1_1, S1_2, and S1_3, respectively. The drain terminal of transistors T(1, 1, 1), T(1, 1, 2), and T(1, 1, 3) are coupled to color dots CD_1, CD_2, and CD_3 of pixel P(1, 1), respectively. However, color dot CD_1 and CD_3 of pixel P(1, 1) are on the row of color dots below gate line G1 while color dot CD_2 of pixel P(1, 1) is on the row of color dots above gate line G1.

In display 500, the transistor on each gate line alternate between controlling color dots of a first row of color dots and controlling color dots on a second row of color dots. By alternating every transistor the present invention can achieve switching element point inversion using switching element row inversion. However, some embodiments of the present invention may have an uneven distribution between the color dots of the first row of color dots and the second row of color dots. For example in one embodiment of the present invention, every third transistors of a gate line is coupled to a second row of color dots, while the other transistors are coupled to a first row of color dots. A feature of display 500 is the offset color alignment due to the vertical offset between the second color component and the first and third color components of each pixel. This feature is suitable for the delta type color layout which provides higher image quality than standard stripe pattern color layouts.

However, stripe pattern color layout provides higher quality text quality than delta type color layout. For displays using the strip pattern color layout, embodiments of the present invention include a novel driving scheme to enhance the color alignment. Specifically, in display 500 the offset color alignment feature is created because transistors on a gate line are coupled to more than one row of color dots. The novel driving scheme delays source signals to realign color components.

Figure 6:
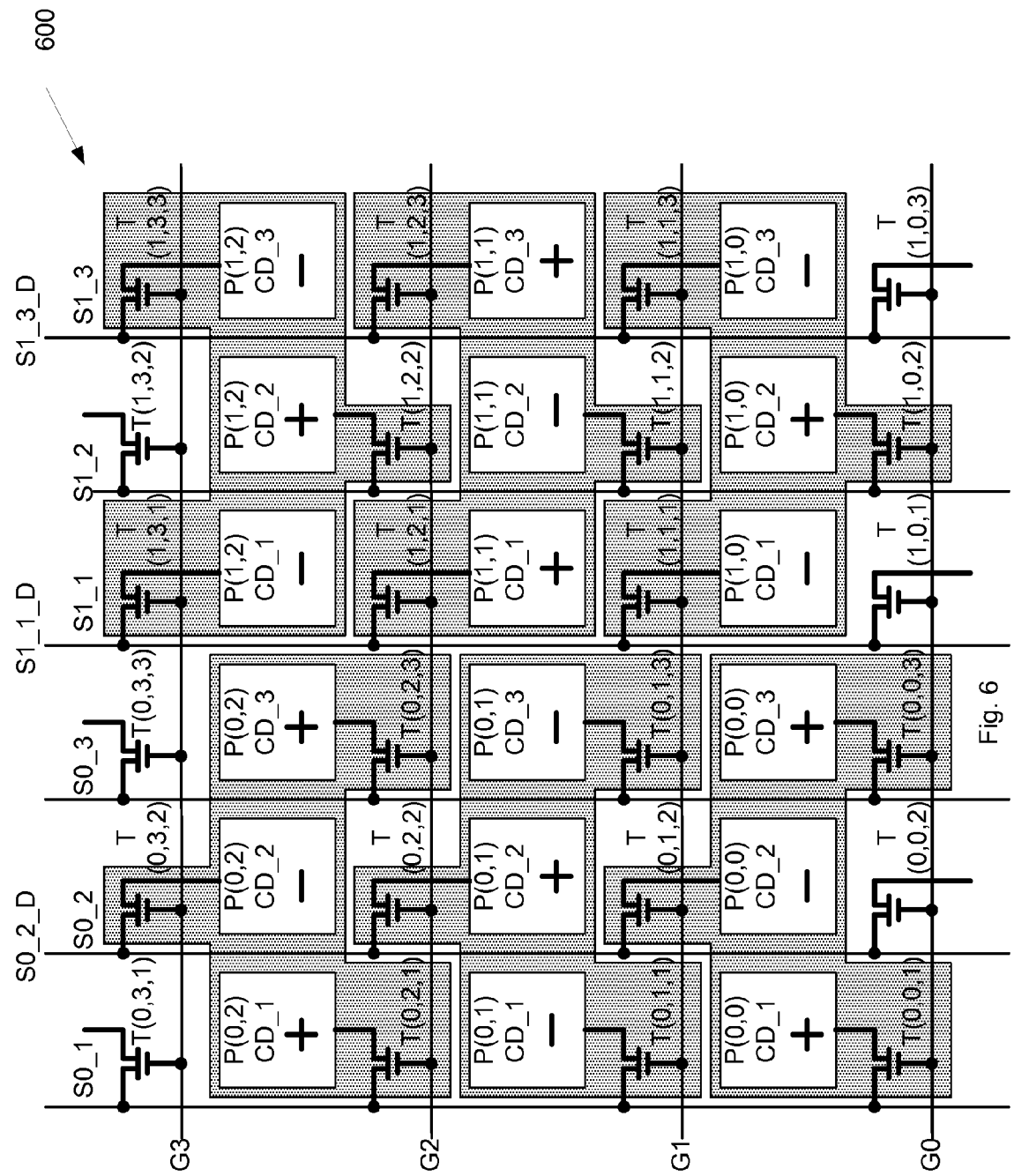
FIG. 6 is an illustration of a display in accordance with an embodiment of the present invention.

FIG. 6 illustrates a display 600 using the novel driving scheme in accordance with one embodiment of the present invention. FIG. 6 is similar to FIG. 5 except that signals applied to some of the source lines are delayed. Thus the description is not repeated. Specifically, delayed source signal S0_2_D, S1_1_D, and S1_3_D are applied to source lines S0_2, S1_1, and S1_3, respectively. In one embodiment of the present invention the delayed source lines are generated using delay circuitry in the timing controller. In another embodiment of the present invention a separate timing control delay unit is used with source signals S0_2, S1_1 and S1_3 (as used in FIG. 5). The delay period is equal to one row refresh period. As explained in more detail below, conventional components can be used with a timing control delay unit or minor modifications can be made to conventional components to generate the delayed source lines.

As illustrated in FIG. 6, the color components of the pixels are realigned when using delayed source signals. In particular, 6 pixels (P(0, 0), P(0, 1), P(0, 2), P(1, 0), P(1, 1), and P(1, 2) are illustrated in display 600. For clarity, the area of each pixel is shaded; this shading is only for illustrative purposes in FIG. 6 and has no functional significance.

Pixel P(0, 1) of display 600 includes transistors T(0, 1, 1), T(0, 2, 2), and T(0, 1, 3). The gate terminal of transistors T(0, 1, 1) and T(0, 1, 3) are coupled to gate line G1. However, the gate terminal of transistor T(0, 2, 2) is coupled to gate line G2. Thus, pixels in display 600 are controlled by multiple gate lines. As explained above, only one gate line is active at a time, thus the color dots of the pixels in display 600 are charged at different times. However the slight delay from one gate line to the next is not perceptible to a user of display 600.

Figure 7:
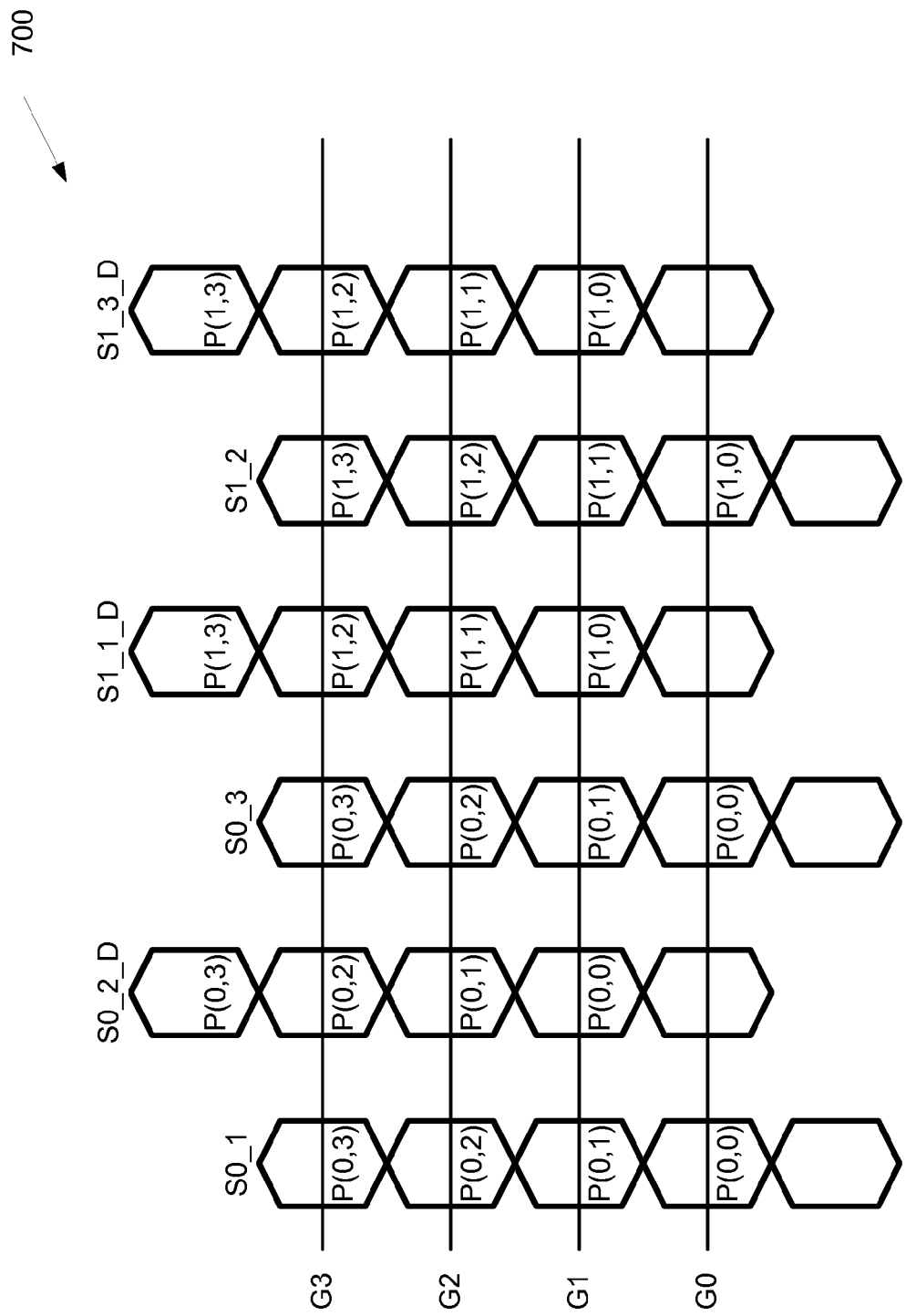
FIG. 7 is a timing diagram for a display in accordance with an embodiment of the present invention.

FIG. 7 shows a simplified timing diagram 700 for source signals S0_1, S0_2_D, S0_3, S1_1_D, S1_2, S1_3_D, which are applied to source lines S0_1, S0_2, S0_3, S1_1, S1_2, and S1_3. In FIG. 7 the horizontal lines labeled G0, G1, G2, and G3, represent the time period that gate lines G1, G1, G2, or G3, respectively, is active. Furthermore, the pixel for which the data is intended is marked within the signal. Source signal S0_2_D, S1_1_D, and S1_3_D are generated by delaying source signals S0_2, S1_1, and S1_3, respectively, by one row refresh period.

As shown in FIG. 7, when gate line G0 is active, data for pixel P(0, 0) is available on source lines S0_1 and S0_3 and data for pixel P(1, 0) is available on source line S1_2. Furthermore as shown in FIG. 6, when gate line G0 is active, transistor T(0, 0, 1) refreshes color dot CD_1 of pixel P(0, 0) with the data on source line S0_1; transistor T(0, 0, 3) refreshes color dot CD_3 of pixel P(0, 0) with the data on source line S0_3; and transistor T(1, 0, 2) refreshes color dot CD_2 of pixel P(1, 0) with data on source line S1_2. However, at this time color dot CD_2 of pixel P(0, 0) and color dots CD_1 and CD_3 of pixel P(1, 0) have not been refreshed with new data.

When gate line G1 is active, data for pixel P(0, 0) is available on source line S0_2, data for pixel P(0, 1) is available on source lines S0_1 and S0_3, data for pixel P(1, 0) is available on source lines S1_1 and S1_3, and data for pixel P(1, 1) is available on source line S1_2. Furthermore as shown in FIG. 6, when gate line G1 is active transistor T(0, 1, 1) refreshes color dot CD_1 of pixel P(0, 1) with the data on source line S0_1; transistor T(0, 1, 2) refreshes color dot CD_2 of pixel P(0, 0) with the data on source line S0_2; transistor T(0, 1, 3) refreshes color dot CD_3 of pixel P(0, 1) with data on source line S0_3; transistor T(1, 1, 1) refreshes color dot CD_1 of pixel P(1, 0) with the data on source line S1_1; transistor T(1, 1, 2) refreshes color dot CD_2 of pixel P(1, 1) with the data on source line S1_2; and transistor T(1, 1, 3) refreshes color dot CD_3 of pixel P(1, 0) with data on source line S1_3. Thus, at this time all the color dots of pixels P(0, 0) and P(1, 0) have been refreshed. However, only some of the color dots of pixels P(0, 1) and P(1, 1) have been refreshed.

When gate line G2 is active, data for pixel P(0, 1) is available on source line S0_2, data for pixel P(0, 2) is available on source lines S0_1 and S0_3, data for pixel P(1, 1) is available on source lines S1_1 and S1_3, and data for pixel P(1, 2) is available on source line S1_2. Furthermore as shown in FIG. 6, when gate line G2 is active transistor T(0, 2, 1) refreshes color dot CD_1 of pixel P(0, 2) with the data on source line S0_1; transistor T(0, 2, 2) refreshes color dot CD_2 of pixel P(0, 1) with the data on source line S0_2; transistor T(0, 2, 3) refreshes color dot CD_3 of pixel P(0, 2) with data on source line S0_3; transistor T(1, 2, 1) refreshes color dot CD_1 of pixel P(1, 1) with the data on source line S1_1; transistor T(1, 2, 2) refreshes color dot CD_2 of pixel P(1, 2) with the data on source line S1_2; and transistor T(1, 2, 3) refreshes color dot CD_3 of pixel P(1, 1) with data on source line S1_3. Thus, at this time all the color dots of pixels P(0, 0), P(1, 0), P(0, 1), and P(1, 1) have been refreshed. However, only some of the color dots of pixels P(0, 2) and P(1, 2) have been refreshed.

When gate line G3 is active, data for pixel P(0, 2) is available on source line S0_2, data for pixel P(0, 3) is available on source lines S0_1 and S0_3, data for pixel P(1, 2) is available on source lines S1_1 and S1_3, and data for pixel P(1, 3) is available on source line S1_2. Furthermore as shown in FIG. 6, when gate line G3 is active transistor T(0, 3, 1) refreshes a color dot of a pixel that is not shown with the data on source line S0_1; transistor T(0, 3, 2) refreshes color dot CD_2 of pixel P(0, 2) with the data on source line S0_2; transistor T(0, 3, 3) refreshes a color dot of a pixel that is not shown with data on source line S0_3; transistor T(1, 3, 1) refreshes color dot CD_1 of pixel P(1, 2) with the data on source line S1_1; transistor T(1, 3, 2) refreshes a color dot of a pixel that is not shown with the data on source line S1_2; and transistor T(1, 3, 3) refreshes color dot CD_3 of pixel P(1, 2) with data on source line S1_3. Thus, at this time all the color dots of pixels P(0, 0), P(1, 0), P(0, 1), P(1, 1), P(0, 2), and P(1, 2) have been refreshed. The remaining pixels (not shown) of display 600 are refreshed similarly. Thus, display 600 has switching element point inversion driving scheme while only needing switching element row inversion driving circuits and is well suited for stripe color layout.

Figure 8:
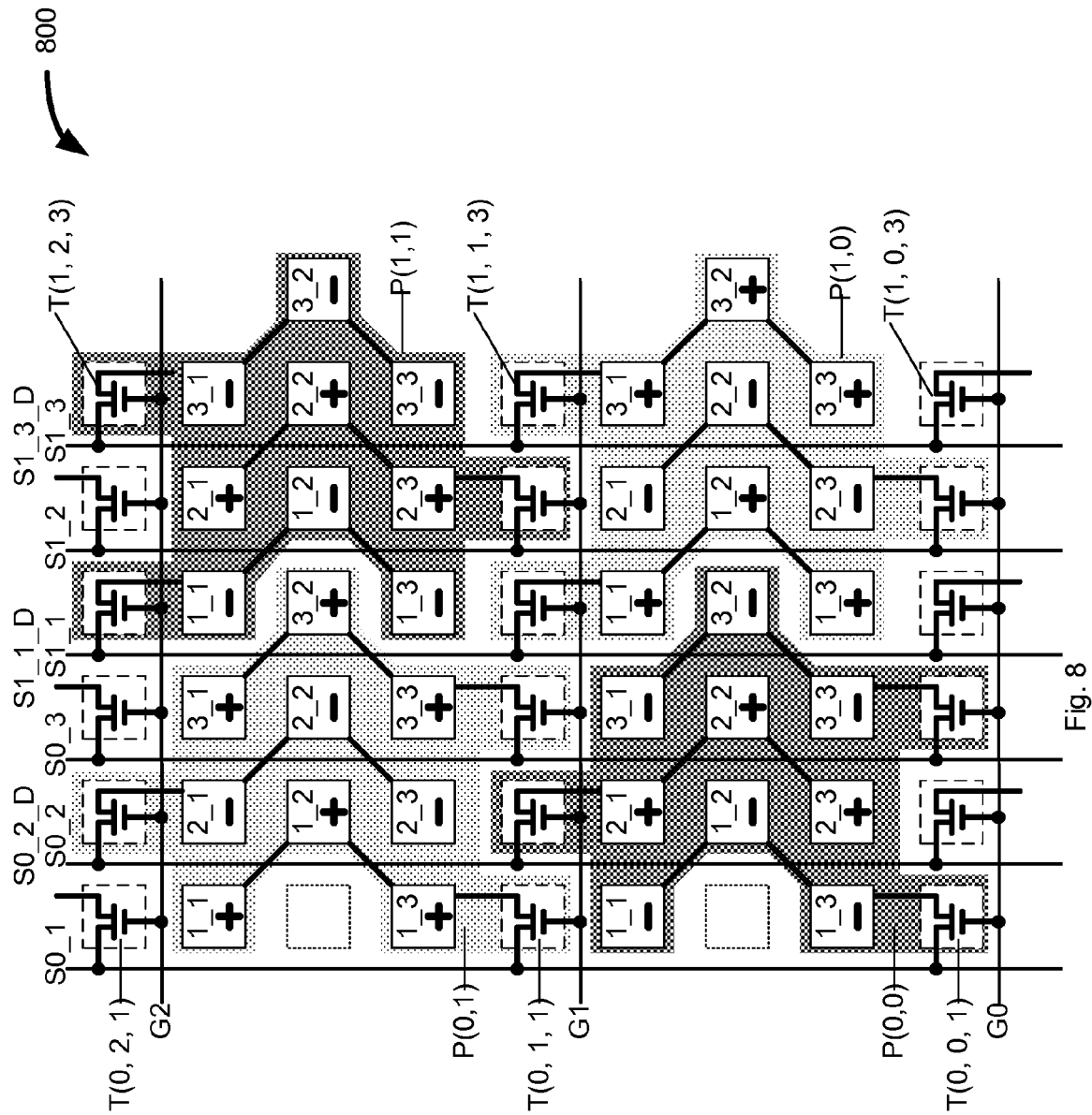
FIG. 8 is an illustration of a display in accordance with another embodiment of the present invention using multiple dots per color component.

The present invention can also be used with displays that have multiple color dots in each color component. FIG. 8 illustrates a display 800 using the novel driving scheme and novel transistor arrangement in accordance with one embodiment of the present invention. FIG. 8 illustrates four pixels P(0, 0), P(0, 1), P(1, 0), and P(1, 1) of display 800. FIG. 8 also includes source lines (S0_1, S0_2, S0_3, S1_1, S1_2, and S1_3,) and gate lines (G0, G1, and G2). Each Gate line extends from the left side of display 800 to the right side. Each source line runs from the top to the bottom of display 800. In display 800, each pixel includes three color components and each color component includes three color dots. The color dots in each color component is arranged in a left-right-left zigzag pattern (as used herein a left-right-left zigzag pattern includes a first color dot, a second color dot to the right and below the first color dot, and a third color to the left of and below the second color dot). Due to space constraints the color dots are labeled with X_Y (rather than CD_X_Y), where X is the color component number and Y is the color dot number. In the description the notation CD_X_Y is used for clarity. Thus 1_1 of pixel P(1, 0) is color dot CD_1_1 which refers to the first color dot of the first color component of Pixel P(1, 0). Due to space limitations the transistors in FIG. 8 are not specifically labeled, however the same reference scheme used in FIG. 6 is used to reference the transistors of FIG. 8. Specifically, a transistor T(I, J, K) is coupled to gate line GJ, and source line SI_K, as exemplified by transistor T(1, 0, 3) (referenced in FIG. 8) which is coupled to gate line G0 and source line S1_3. For clarity transistors T(0, 0, 1), T(0, 1, 1), T(0, 2, 1), T(1, 2, 3) and T(1, 1, 3) are also labeled in FIG. 8. Like FIG. 6, delayed source signal S0_2_D, S1_1_D, and S1_3_D are applied to source lines S0_2, S1_1, and S1_3, respectively. The transistors in FIG. 8 are coupled to gate lines and source lines in the same manner as the transistors in FIG. 6 are coupled to gate lines and source lines. Thus, for the same reasons explained above, display 800 also uses switching element point inversion driving schemes.

For clarity, the area of each pixel in FIG. 8 is shaded; this shading is only for illustrative purposes in FIG. 8 and has no functional significance. Pixel P(0, 1) includes transistors T(0, 1, 1), T(0, 2, 2), and T(0, 1, 3), the associated dots encompassing the transistors, as well as the color dots coupled to the transistors (in the shaded background area). Specifically, in pixel P(1, 0), the first color component (i.e., color dots CD_1_1, CD_1_2, and CD_1_3) is coupled to transistor T(0, 1, 1); the second color component (i.e., CD_2_1, CD_2_2, and CD_2_3) is coupled to transistor T(0, 2, 2), and the third color component (i.e., color dots CD_3_1, CD_3_2, and CD_3_3) is coupled to transistor T(0, 1, 3). Pixel P(1, 1) includes transistors T(1, 2, 1), T(1, 1, 2), and T(1, 2, 3), the associated dots encompassing the transistors, as well as the color dots coupled to the transistors (in the shaded background area). Specifically, in pixel P(1, 1), the first color component (i.e., color dots CD_1_1, CD_1_2, and CD_1_3) is coupled to transistor T(1, 2, 1); the second color component (i.e., CD_2_1, CD_2_2, and CD_2_3) is coupled to transistor T(1, 1, 2), and the third color component (i.e., color dots CD_3_1, CD_3_2, and CD_3_3) is coupled to transistor T(1, 2, 3).

Pixel P(0, 0) includes transistors T(0, 0, 1), T(0, 1, 2), and T(0, 0, 3), the associated dots encompassing the transistors, as well as the color dots coupled to the transistors (in the shaded background area). Specifically, in pixel P(1, 0), the first color component (i.e., color dots CD_1_1, CD_1_2, and CD_1_3) is coupled to transistor T(0, 0, 1); the second color component (i.e., CD_2_1, CD_2_2, and CD_2_3) is coupled to transistor T(0, 1, 2), and the third color component (i.e., color dots CD_3_1, CD_3_2, and CD_3_3) is coupled to transistor T(0, 0, 3). Pixel P(1, 0) includes transistors T(1, 1, 1), T(1, 0, 2), and T(1, 1, 3), the associated dots encompassing the transistors, as well as the color dots coupled to the transistors (in the shaded background area). Specifically, in pixel P(1, 1), the first color component (i.e., color dots CD_1_1, CD_1_2, and CD_1_3) is coupled to transistor T(1, 1, 1); the second color component (i.e., CD_2_1, CD_2_2, and CD_2_3) is coupled to transistor T(1, 0, 2), and the third color component (i.e., color dots CD_3_1, CD_3_2, and CD_3_3) is coupled to transistor T(1, 1, 3).

Figure 9A:
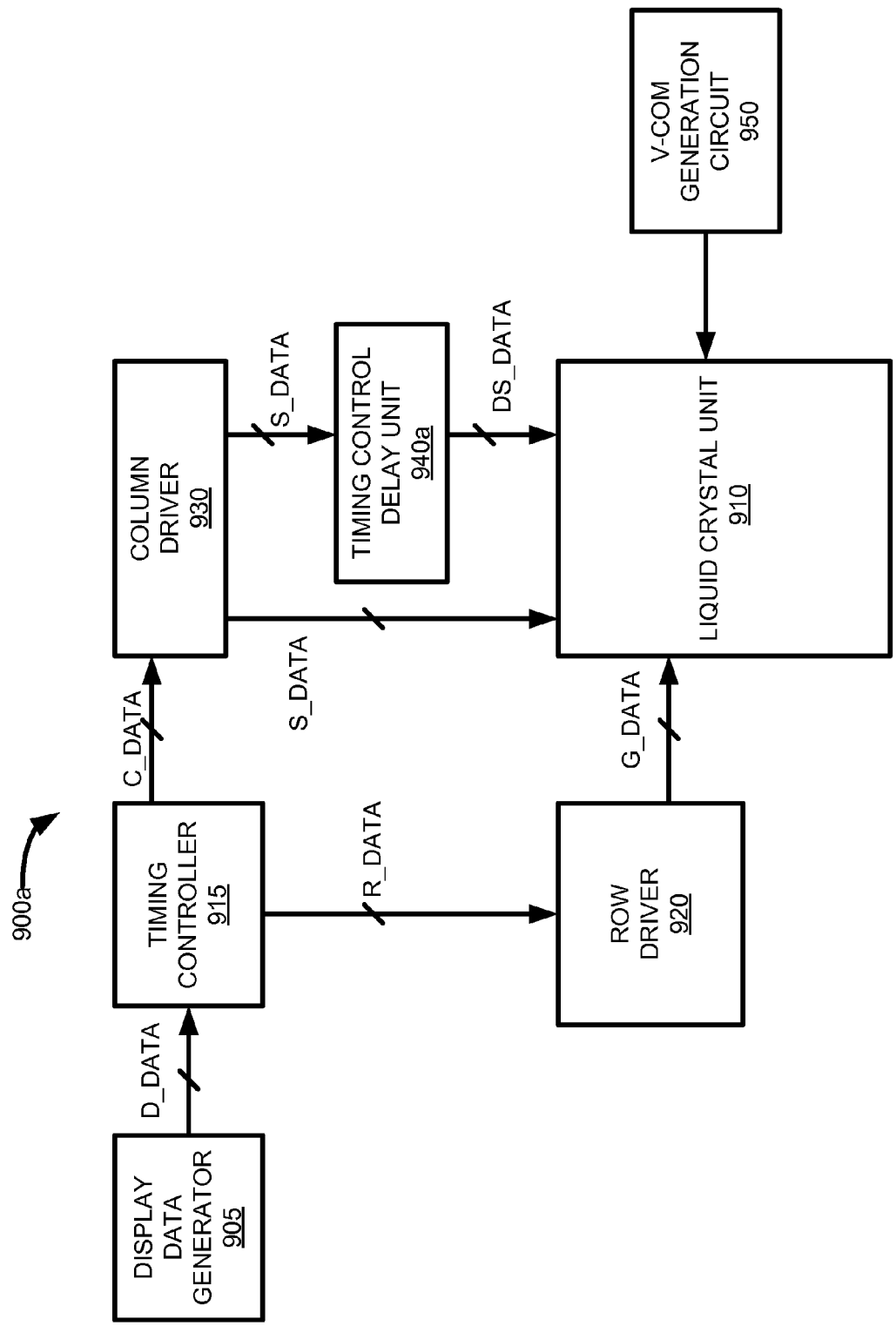
FIG. 9(a) is a simplified block diagram of a display in accordance with an embodiment of the present invention.

FIG. 9(a) is a simplified block diagram of a display 900a having a liquid crystal unit 910, and a display control system, which includes display data generator 905, a timing controller 915, a row driver 920, a column driver 930, timing control delay unit 940a, and V_COM generation circuit 950, which generates common reference V_COM for liquid crystal unit 910. Liquid crystal unit 910 includes the liquid crystals, color dots, transistors, gate lines, and source lines illustrated in FIGS. 5 and 6. Display data generator 905 creates display data D_DATA for timing controller 915, which generates column data C_DATA and row data R_DATA for column driver 930 and row driver 920, respectively. Row driver 920 drives gate data G_DATA onto the gate lines in liquid crystal unit 910. Column driver 930 drives source data S_data on the source lines in liquid crystal unit 910. However, a subset of the column control lines from column driver 930 is delayed by timing control delay unit 940a to form delayed source data DS_DATA as explained above. Liquid crystal unit 910 uses the novel transistor arrangement exemplified in FIGS. 5 and 6. Due to the novel transistor arrangement, display data generator 905, timing controller 915, column driver 930 and row driver 920 can be of conventional switching element row inversion designs. However, as explained above display 900 has switching element point inversion by using the novel transistor arrangement and timing control delay unit 940*a*.

Figure 9B:
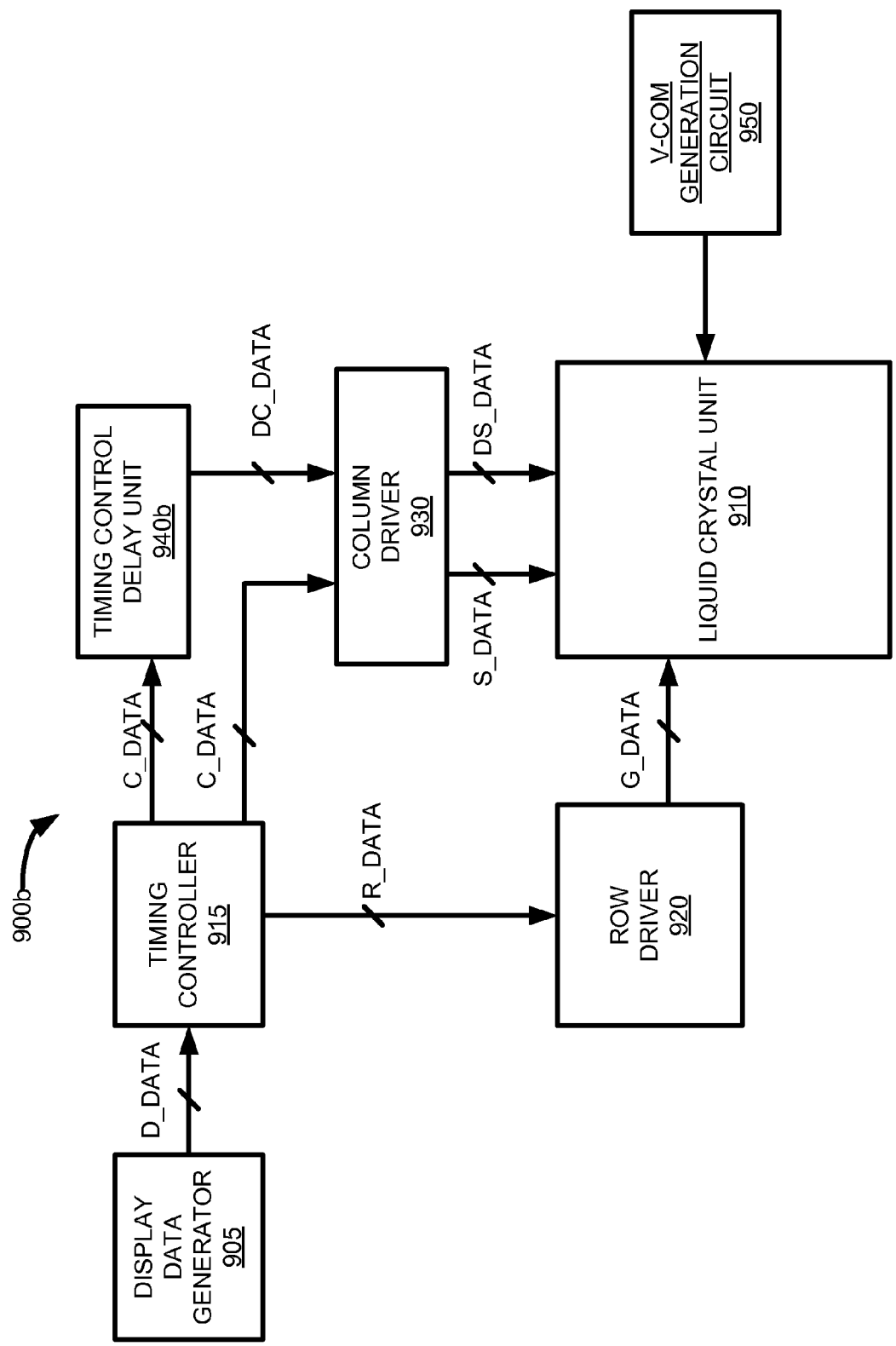
FIG. 9(b) is a simplified block diagram of a display in accordance with an embodiment of the present invention.
Figure 9C:
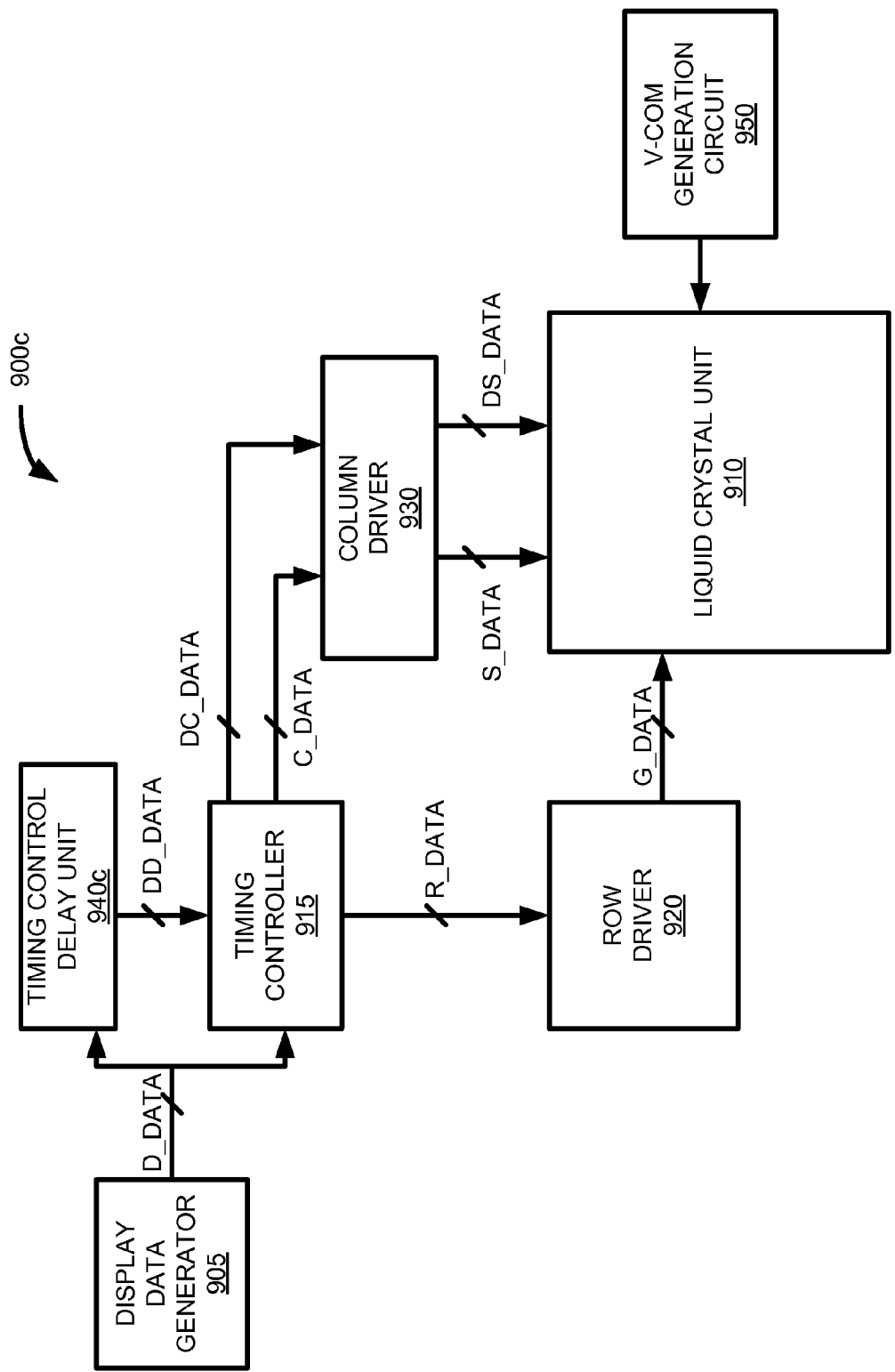
FIG. 9(c) is a simplified block diagram of a display in accordance with an embodiment of the present invention.

FIG. 9(*b*) is a simplified block diagram of a display 900*b* in accordance with another embodiment of the present invention. Display 900*b* uses the same components as display 900*a* except that a timing control delay unit 940*b* is used in place of timing control delay unit 940*a*. For brevity the description of the elements that are the same in display 900*a* and 900*b* is not repeated. In display 900*b*, timing control delay unit 940*a* is removed and column driver 930 drives all the source lines of liquid crystal unit 910 directly. However, timing control delay unit 940*b* is placed in between timing controller 915 and column driver 930. Specifically, timing control delay unit 940*b* delays a subset of column data C_DATA from timing controller 915 and provides delayed column data DC_DATA to column driver 930. Thus, column driver 930 still provides source data S_DATA and delayed source data DS_DATA to the source lines in liquid crystal unit 910. For example if liquid crystal unit 910 uses the novel transistor arrangement exemplified in FIG. 5. half of the column data signals (every other one starting from the second data line) from timing controller 915 to column driver 930 are delayed.

FIG. 9(*c*) is a simplified block diagram of a display 900*c* in accordance with another embodiment of the present invention. Display 900*c* uses the same components as display 900*a* except that a timing control delay unit 940*c* is used in place of timing control delay unit 940*a*. For brevity the description of the elements that are the same in display 900*a* and 900*c* is not repeated. In display 900*c*, timing control delay unit 940*a* is removed and column driver 930 drives all the source lines of liquid crystal unit 910 directly. However, timing control delay unit 940*c* is placed between timing controller 915 and display data generator 905. A subset of the display data signals D_DATA are delayed by timing control delay unit 940*c* to create delayed display data signals DD_DATA. The remaining display data signals and the delayed display data signals are provided to timing controller 915 which generates column data signals C_DATA and delayed column data signals DC_DATA for column driver 930 and row data signals R_DATA for row driver 920. Specifically, the display data signals corresponding to a subset of the columns are delayed. Because of the delayed display data signals, column driver 930 still provides delayed source data signals DS_DATA to a subset of the source lines in liquid crystal unit 910.

As explained above, one benefit of the present invention is that conventional components for switching element row inversion displays can be used to create a switching element point inversion display with the timing control delay unit 940*a*, 940*b*, or 940*c*. However, to reduce component costs timing control delay units can be integrated with one or more of the components described in FIGS. 9(*a*)-9(*c*). For example, timing control delay unit 940*a* can be integrated with column driver 930. Timing control delay unit 940*b* can be integrated with timing controller 915 or column driver 930. Timing control delay unit 940*c* can be integrated with timing controller 915 or display data generator 905. In general, integration with either timing controller 915 or display data generator 905 would be less costly than integration with column driver 930.

Using the structure and methods disclosed in FIGS. 5-8 and 9(*a*)-9(*c*), a display with switching element point inversion driving scheme can be implemented using integrated circuits that are designed to implement switching element row inversion driving scheme. In addition, using the structure and methods disclosed in FIGS. 5-8 and 9(*a*)-9(*c*), a display with switching element row inversion driving scheme can be implemented using integrated circuits that are designed to implement switching element point inversion driving scheme.

Figure 10:
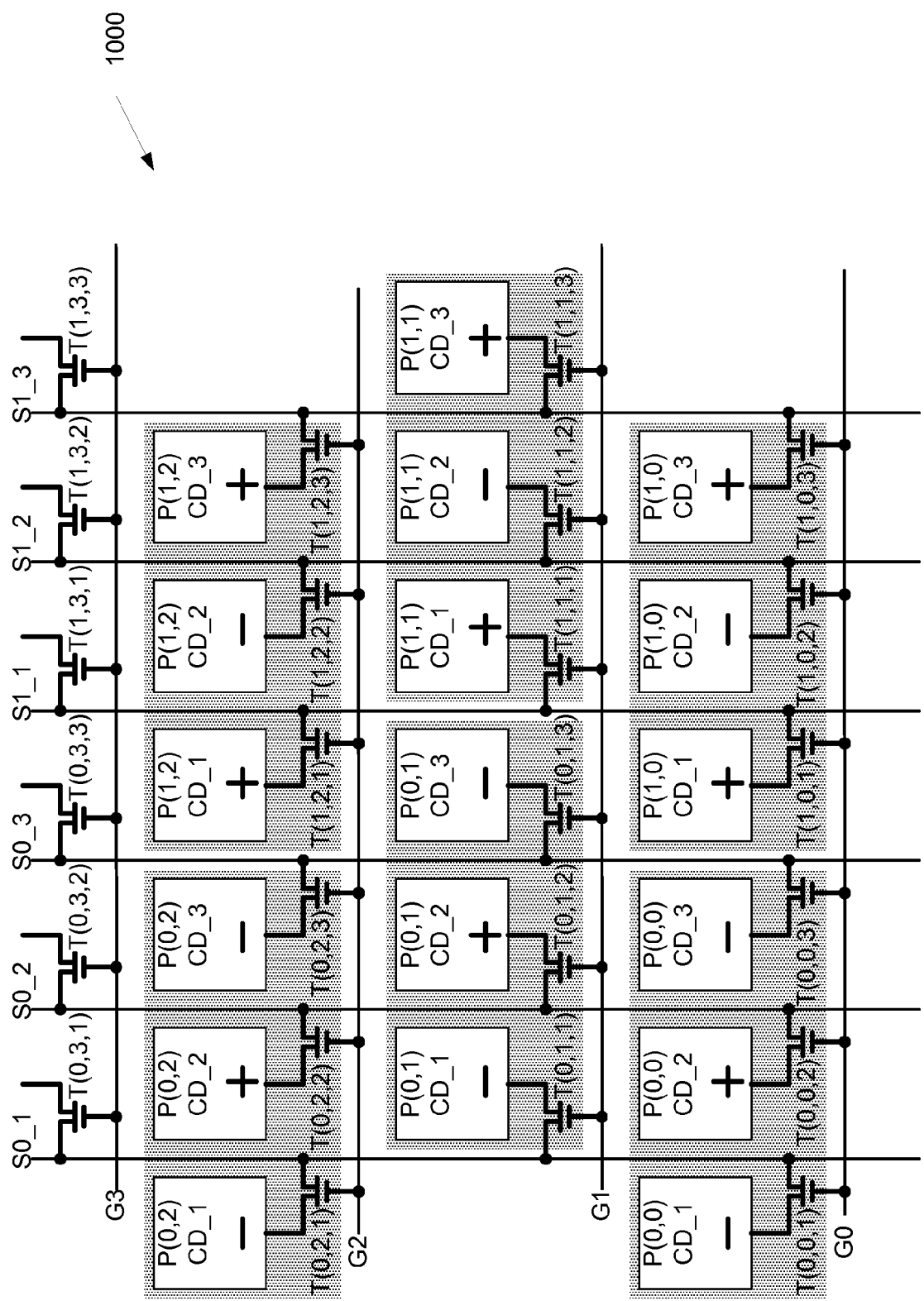
FIG. 10 is an illustration of a display in accordance with another embodiment of the present invention.

Furthermore, using the structure and methods disclosed in the present invention, a display with switching element point inversion driving scheme can be implemented using integrated circuits that are designed to implement switching element column inversion driving scheme. Specifically, on every other row of a display the transistor and corresponding color dot are placed on the other side of the source line. FIG. 10 illustrates a portion of a display 1000 in accordance with one embodiment of the present invention. In display 1000, the source terminal of a transistor is coupled to a source line; the gate terminal of the transistor is coupled to a gate line; and the drain terminal of the transistor is coupled to the electrode of a color dot. For clarity, transistors are labeled and referenced as transistor T(X, Y, Z), such that the source terminal of transistor T(X, Y, Z) is coupled to source line SX_Z and the gate terminal of transistor T(X, Y, Z) is coupled to gate line GY. The primary difference between display 1000 and displays 400-430 is that transistors coupled to the same source line control color dots on different columns in display 1000. Thus for example transistor T(0, 1, 2) controls a color dot on the column of color dots to the right of source line S0_2 and transistor T(0, 2, 2) controls a color dot on the column of color dots to the left of source line S0_2. In general for display 1000, a transistor T(X, Y, Z) controls a color dot to the right of source line S_X_Z when Y is an odd number and controls a color dot to the left of source line S_X_Z when Y is an even number. Thus, each row of pixels is horizontally offset for adjacent rows by the width of a color dot plus the space between color dots (horizontal dot spacing). For example, in display 1000, Pixel P(0, 1), which includes three color dots CD_1, CD_2, and CD_3, which are coupled to transistors T(0, 1, 1), T(0, 1, 2), T(0, 1, 3), respectively, and Pixel P(0, 0) includes color dots CD_1, CD_2, and CD_3, which are coupled to transistors T(0, 0, 1), T(0, 0, 2), T(0, 0, 3), respectively are not horizontally aligned as illustrated by color dot CD_1 of pixel P(0, 0), which is on a different column than color dot CD_1 of pixel P(0, 1). Specifically, the source terminals of both transistors T(0,1,1) and T(0,0,1) are coupled to source line S0_1. However, transistor T(0,1,1) and color dot CD_1 of pixel P(0, 1) is on the right side of source line S0_1 and transistor T(0, 0, 1) and color dot CD_1 of pixel P(0, 0) is on the left side of source line S0_1. Similarly, transistor T(0, 1, 2) and color dot CD_2 of pixel P(0, 1) to the right of source line S0_2 while transistor T(0, 0, 2) and color dot CD_2 of pixel P(0, 0) are on the left side of source line S0_2. Transistors T(0,1,3) and color dot CD_3 of pixel P(0, 1) is on the right side of source line S0_3 while transistor T(0, 0, 3) and color dot CD_3 of pixel P(0, 0) are on the left side of source line S0_3. As explained above, when using switching element column inversion drivers, all of the color dots controlled by transistors coupled to the same source line have the same polarity. Thus as shown in FIG. 10, the overall polarity pattern of the color dots in FIG. 10 is the same as a display using switching element point inversion driving scheme (See FIG. 4(*b*)). However, the power saving and cost reduction in using switching element column inversion drivers to implement switching element point inversion are less than the power saving and cost reduction in using switching element row inversion drivers to implement switching element point inversion.

In the embodiment of FIG. 10, color components in adjacent rows are not aligned. Thus, the embodiment of FIG. 10 uses a delta type color layout. However, some embodiments of the present invention include a novel driving scheme to realign the color components to allow stripe type color layouts.

Specifically, FIG. 11 illustrates a display 1100 using the novel driving scheme in accordance with one embodiment of the present invention. FIG. 11 is similar to FIG. 10 except that the source signals are shifted when certain gate line are active. Specifically, a timing control shift unit 1140a is placed before the source lines when every other gate line is active the source signals are shifted to an adjacent source line. Specifically, when an even numbered gate line (e.g., G0 and G2) is active, source data is shifted to the source line to the right of the original source line. For example, source data S0_1 is shifted to source line S0_2. In addition source data S0_2, S0_3, S1_1, S1_2, and S1_3 are shifted to source lines S0_3, S1_1, S1_2, S1_3, and S2_1, respectively. When an odd numbered gate line is active the source data is not shifted. However, source line S0_1, i.e. the leftmost source line of display 1100 can always receive source data S0_1. For clarity, source lines after the shifting process are labeled with an "s" such as source line S0_2.

Figure 11A:
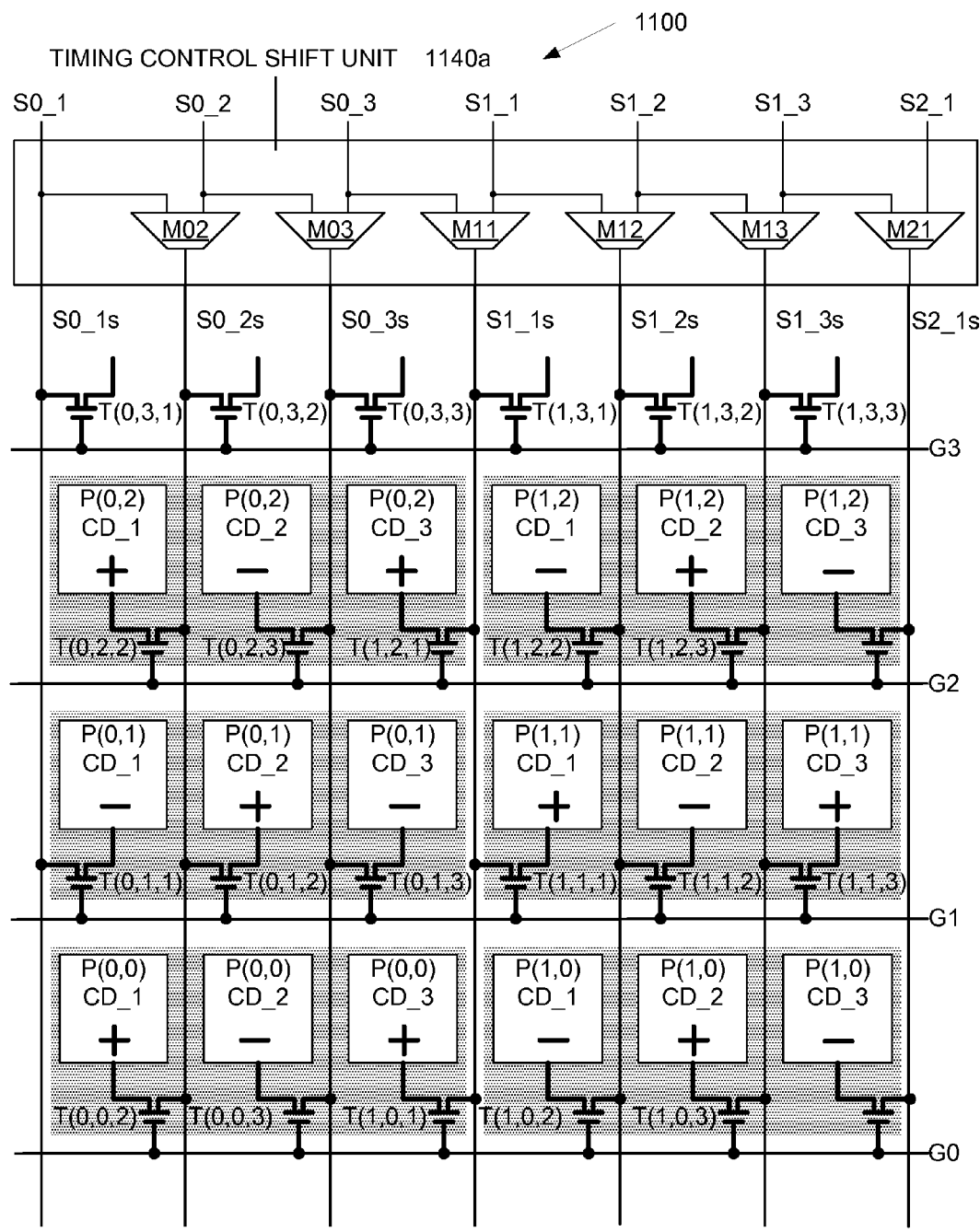
FIG. 11(a) is an illustration of a display in accordance with another embodiment of the present invention.

Understanding the rational for the shifting is best derived by examining both FIG. 10 and FIG. 11(a). For example when gate line G0 is active in FIG. 10, data for color dot CD_1, of pixel P(0, 0) is on source line S0_1, and is received by transistor T(0, 0, 1). When gate line G1 is active data for color dot CD_1 of pixel P(0, 1) is on source line S0_1 and is received by transistor T(0, 1, 1). As clearly shown in FIG. 10 (and FIG. 11) transistors T(0, 0, 1) is not horizontally aligned with transistor T(0, 1, 1). However, in FIG. 11, when gate line G0 is active the data for color dot CD_1 of pixel P(0, 1) is shifted to source line S0_2s and is received by transistor T(0, 0, 2). When gate line G1 is active data for color dot CD_1 of pixel P(0, 1) is on source line S0_1 and is received by transistor T(0, 1, 1). As shown in FIG. 11 (and FIG. 10) transistors T(0, 0, 2) and T(0, 1, 1) are horizontally aligned. Similar reasoning shows that all the color dots of Pixel P(0, 0) are aligned with the corresponding color dots in pixels P(0, 1) and P(0, 2). Thus, using the shifting method described above (and below) causes the pixels in each column of pixels in display 1100 to be horizontally aligned.

In general source data SX_Y is shifted to source line SJ_Ks, where J is equal to X plus the integer portion of Y divided by 3 and K is equal to Y modulo 3 plus 1. Equations EQ1 and EQ2 provides the equations for J and K, respectively.

$$J = X + \text{INT}(Y/3) \quad \text{EQ1}$$

$$K = (Y \text{ MOD } 3) + 1 \quad \text{EQ2}$$

Alternatively, source line SX_Y receives source data SM_N, where M is equal X minus the integer portion of Y divided by 3 and N is equal to one plus the sum of Y and 1 modulo 3. Equations EQ3 and EQ4 provide the equations for M and N, respectively.

$$M = X - \text{INT}(Y/3) \quad \text{EQ3}$$

$$N = ((Y+1) \text{ MOD } 3) + 1 \quad \text{EQ4}$$

As illustrated in FIG. 11, the color components of the pixels are realigned when using delayed source signals. In particular, 6 pixels (P(0, 0), P(0, 1), P(0, 2), P(1, 0), P(1, 1), and P(1, 2) are illustrated in display 1100. For clarity, the area of each pixel is shaded; this shading is only for illustrative purposes in FIG. 11 and has no functional significance.

Also illustrated in FIG. 11(a) is a simple implementation of timing control shift unit 1140a. Specifically, a multiplexer MXY is used to select source data for source line SX_Y as described above. The control terminal of each multiplexer (not shown) is coupled to a signal that is in the active when an even numbered gate line is active and in an inactive state when an odd numbered gate line is active.

Figure 11B:
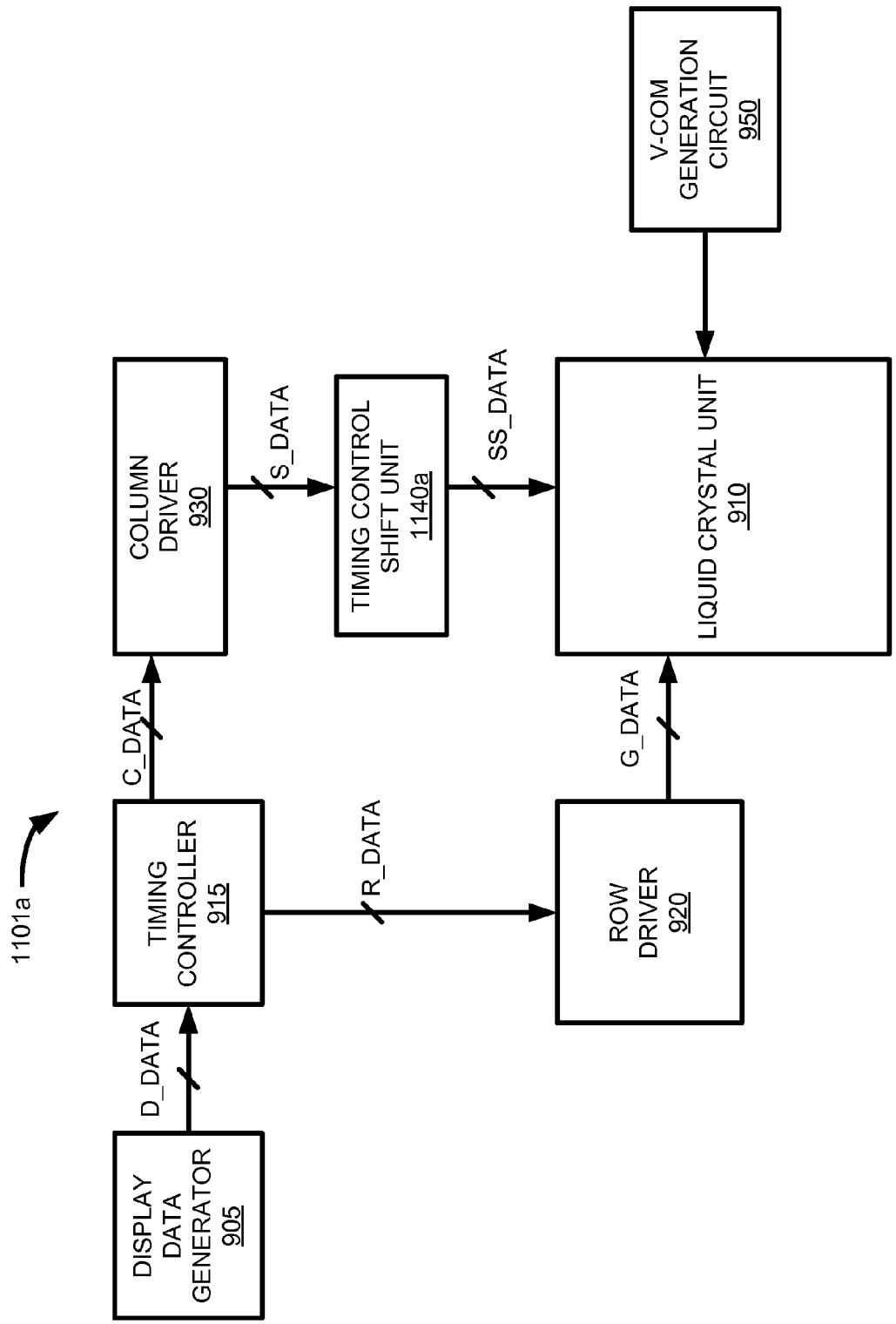
FIG. 11(b) is a simplified block diagram of a display in accordance with an embodiment of the present invention.

FIG. 11(b) is a simplified block diagram of a display 1101a having a liquid crystal unit 910, and a display control system, which includes display data generator 905, a timing controller 915, a row driver 920, a column driver 930, timing control shift unit 1140a, and V_COM generation circuit 950, which generates common reference V_COM for liquid crystal unit 910. Liquid crystal unit 910 includes the liquid crystals, color dots, transistors, gate lines, and source lines illustrated in FIGS. 10 and 11. Display 1101a uses the same components as display 900a except that a timing control shift unit 1140a is used in place of timing control delay unit 940a. For brevity the description of the elements that are the same in display 1101a and display 900a is not repeated. Column driver 930 drives source data S_data to timing control shift unit 1140a to shifted source data SS_DATA as explained above (note shifted source data SS_DATA is only shifted when an odd numbered gate line is active). Liquid crystal unit 910 uses the novel transistor arrangement exemplified in FIGS. 10 and 11. Due to the novel transistor arrangement, display data generator 905, timing controller 915, column driver 930 and row driver 920 can be of conventional switching element column inversion designs. However, as explained above display 1100 has switching element point inversion by using the novel transistor arrangement and timing control shift unit 1140a.

Figure 11C:
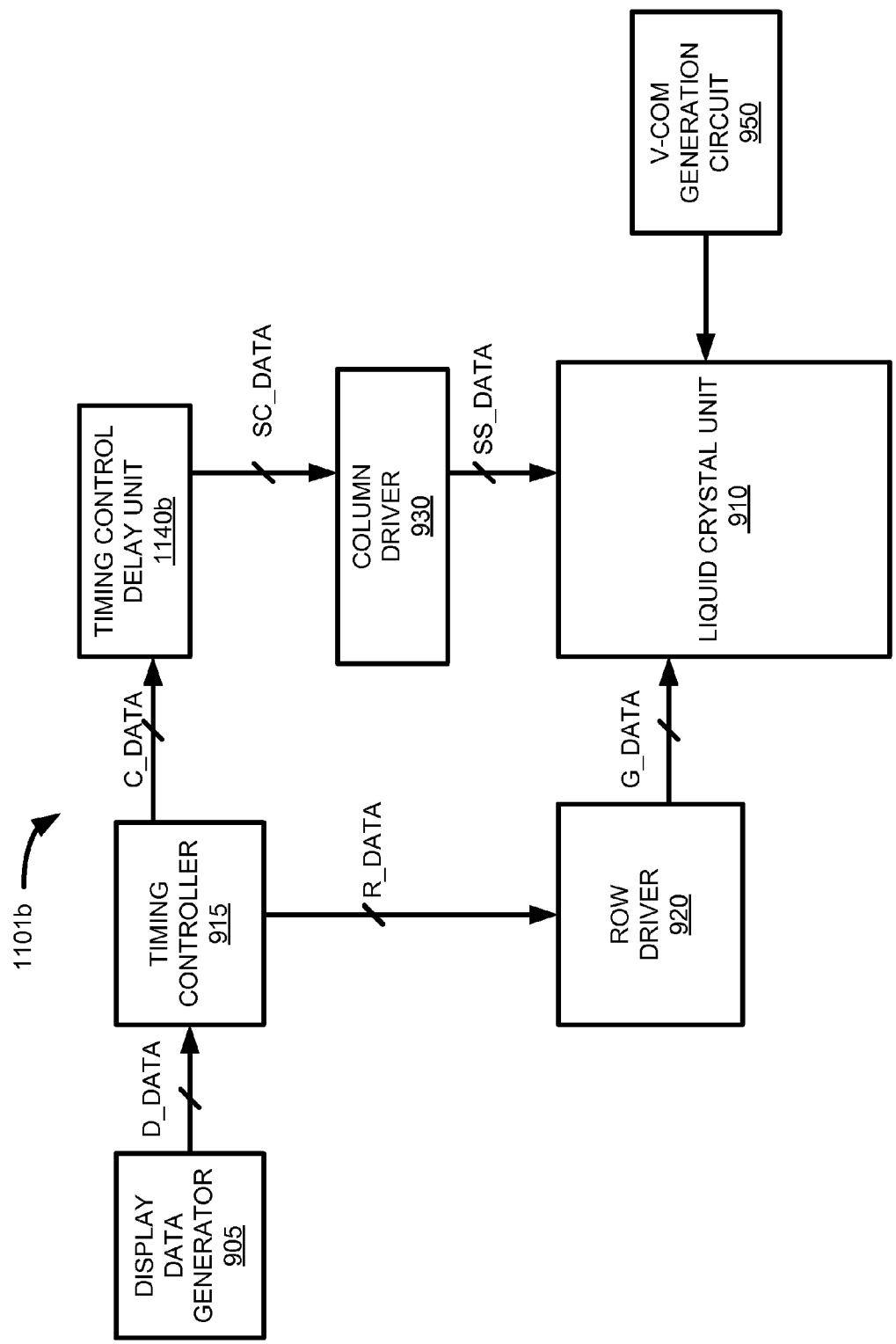
FIG. 11(c) is a simplified block diagram of a display in accordance with an embodiment of the present invention.

FIG. 11(c) is a simplified block diagram of a display 1101b in accordance with another embodiment of the present invention. Display 1101b uses the same components as display 1101a except that a timing control shift unit 1140b is used in place of timing control shift unit 1140a. For brevity the description of the elements that are the same in display 1101a and 1101b is not repeated. In display 1101b, timing control shift unit 1140a is removed and column driver 930 drives all the source lines of liquid crystal unit 910 directly. However, timing control shift unit 1140b is placed in between timing controller 915 and column driver 930. Specifically, timing control delay shift unit 1140b shifts column data C_DATA from timing controller 915 and provides shifted column data SC_DATA to column driver 930. Thus, column driver 930 still provides shifted source data SS_DATA to the source lines in liquid crystal unit 910.

Figure 11D:
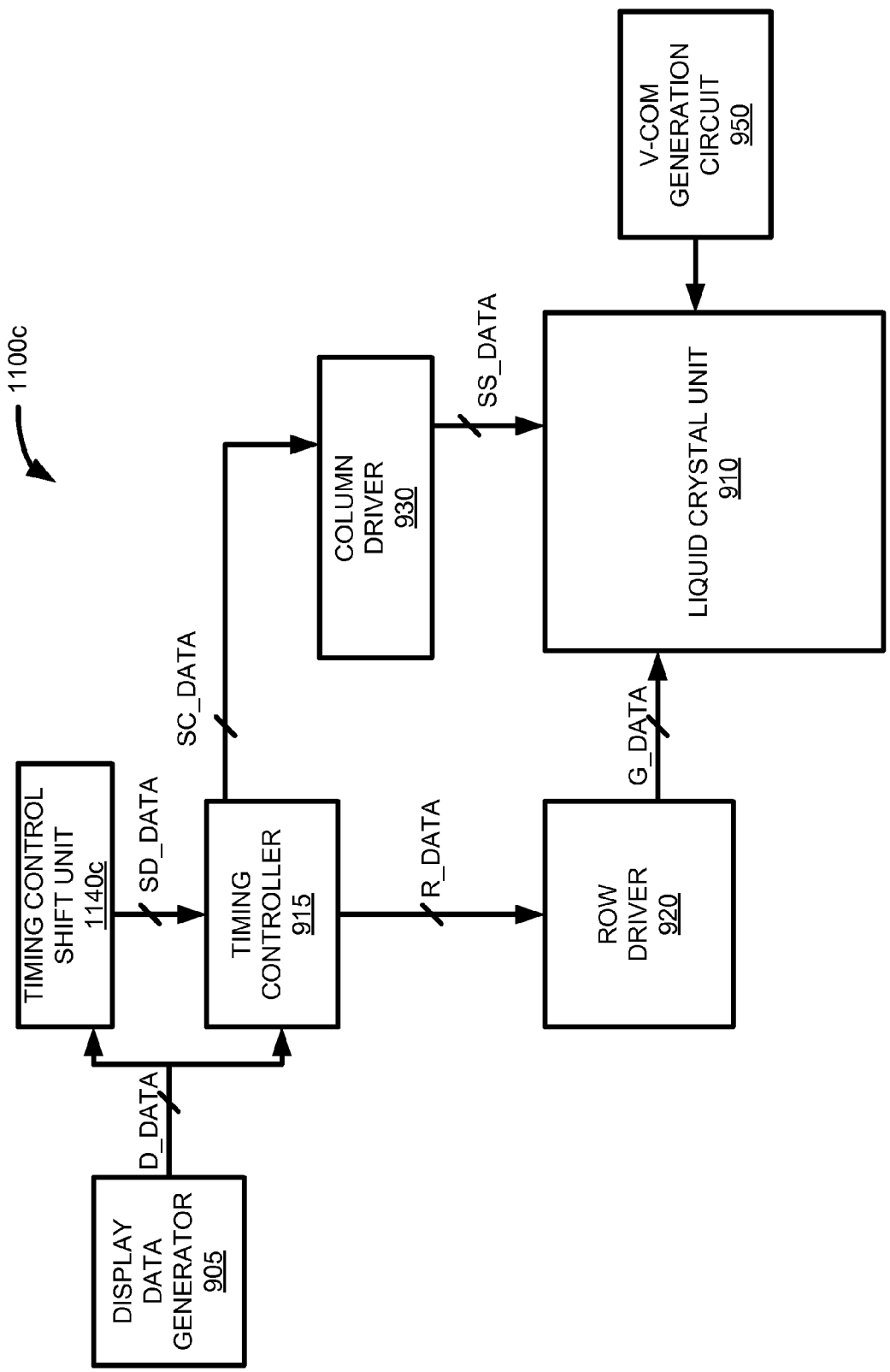
FIG. 11(d) is a simplified block diagram of a display in accordance with an embodiment of the present invention.
Figure 12A:
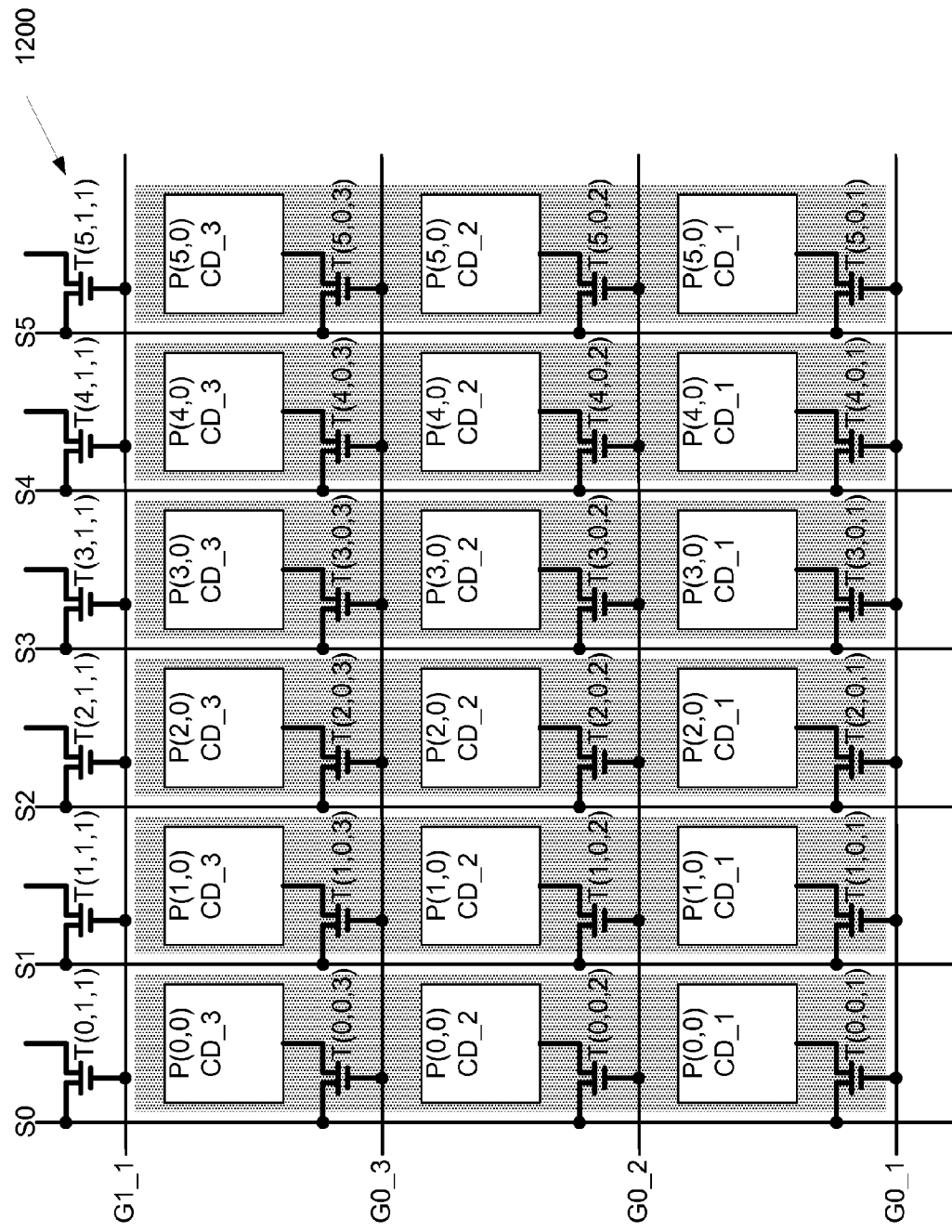
FIGS. 12(a)-12(d) illustrate various switching element inversion driving scheme in displays with horizontal stripe color filter arrangement.
Figure 12B:
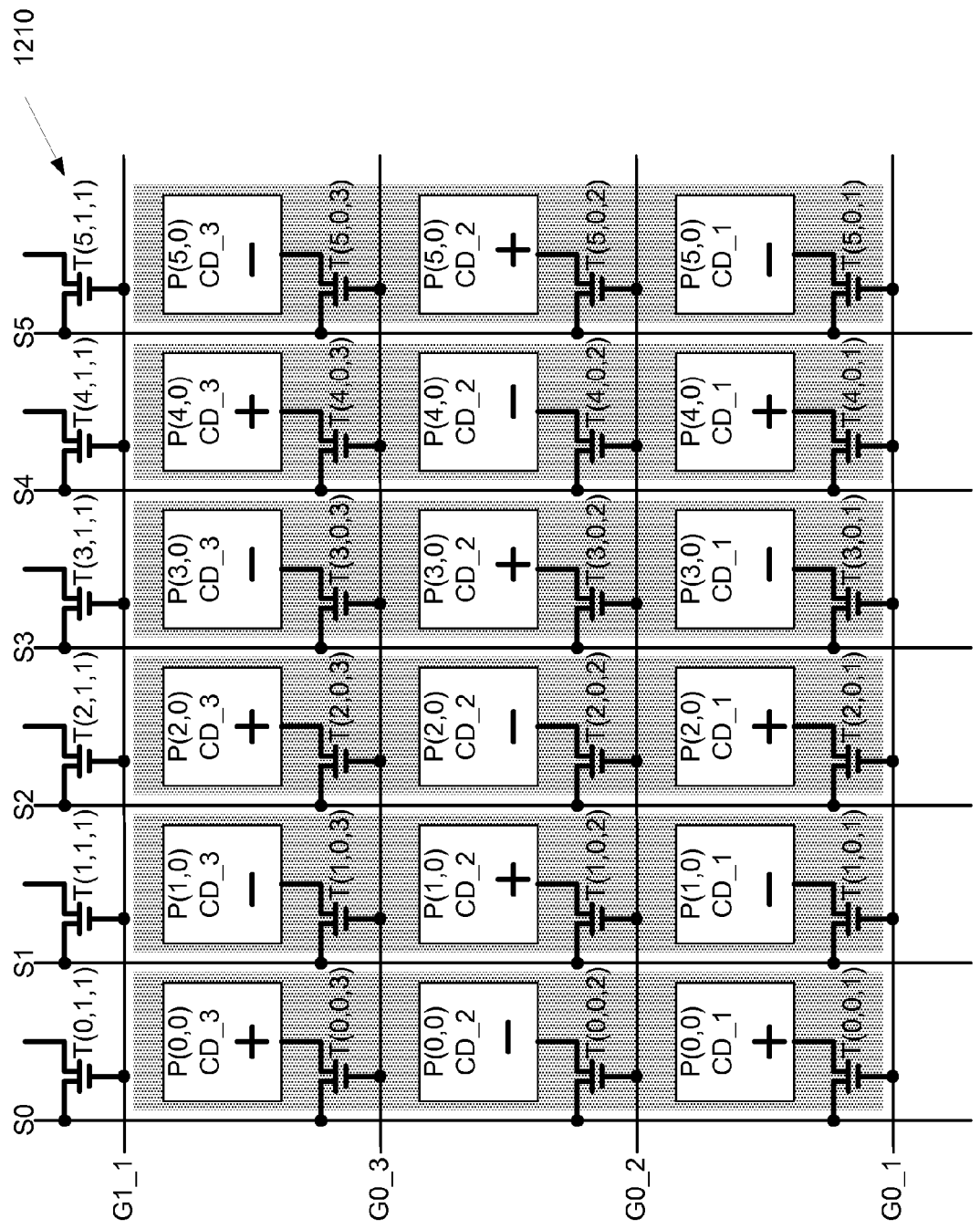
Figure 12C:
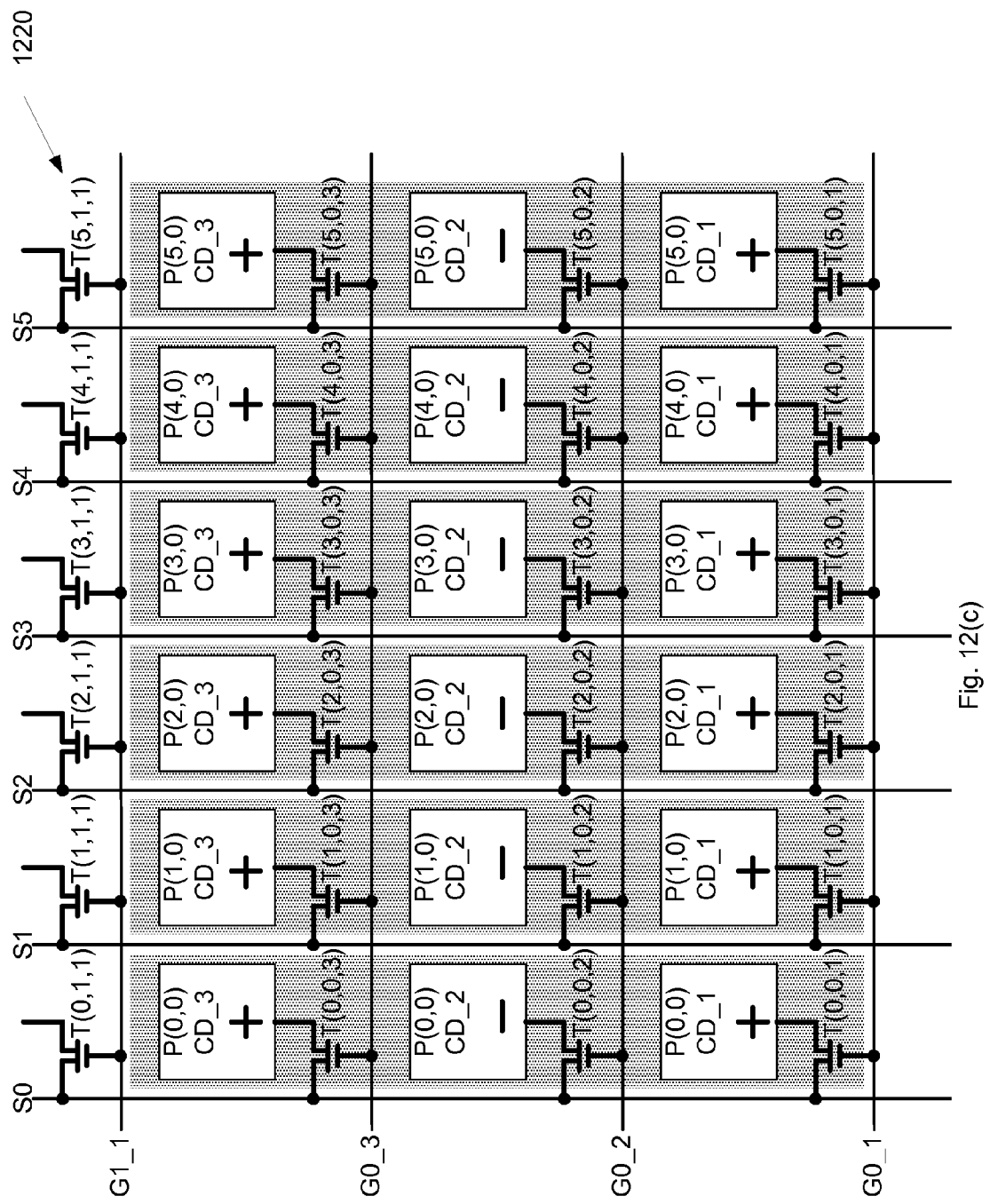
Figure 12D:
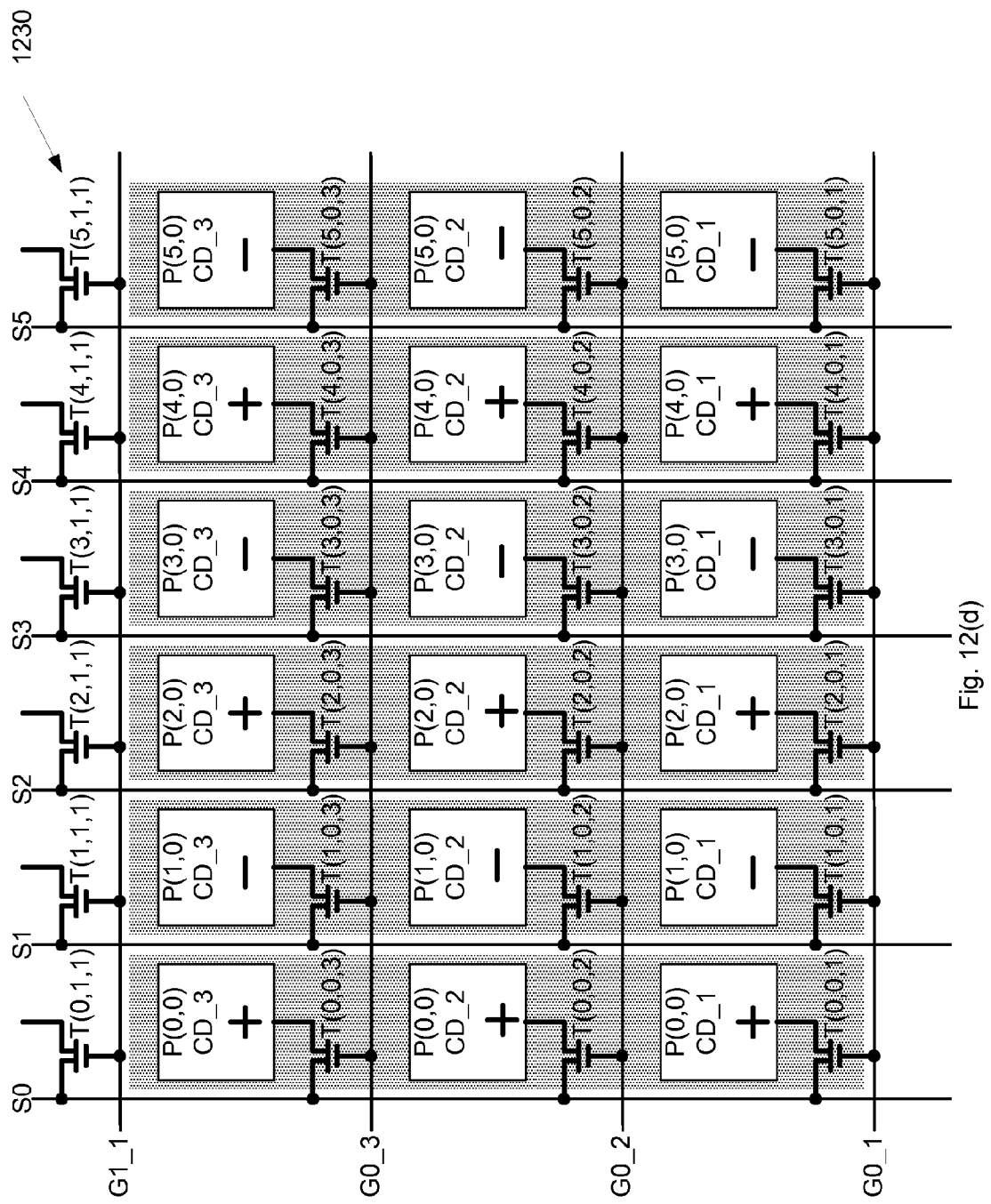

FIG. 11(d) is a simplified block diagram of a display 1101c in accordance with another embodiment of the present invention. Display 1101c uses the same components as display 1101a except that a timing control shift unit 1140c is used in place of timing control shift unit 1140a. For brevity the description of the elements that are the same in display 1101a and 1101c is not repeated. In display 1101c, timing control shift unit 1140a is removed and column driver 930 drives all the source lines of liquid crystal unit 910 directly. However, timing control shift unit 1140c is placed between timing controller 915 and display data generator 905. A subset of the display data signals D_DATA are shifted by timing control delay unit 1140c to create shifted display data signals SD_DATA. The remaining display data signals and the shifted display data signals are provided to timing controller 915 which generates and shifted column data signals SC_DATA for column driver 930 and row data signals R_DATA for row driver 920. Specifically, the display data signals corresponding to a subset of the columns are delayed. Because of the delayed display data signals, column driver 930 still provides shifted source data signals SS_DATA to the source lines in liquid crystal unit 910.

As explained above, one benefit of the present invention is that conventional components for switching element row inversion displays can be used to create a switching element point inversion display with the timing control delay unit 940*a*, 940*b*, or 940*c*. However, to reduce component costs timing control delay units can be integrated with one or more of the components described in FIGS. 9(*a*)-9(*c*). For example, timing control delay unit 940*a* can be integrated with column driver 930. Timing control delay unit 940*b* can be integrated with timing controller 915 or column driver 930. Timing control delay unit 940*c* can be integrated with timing controller 915 or display data generator 905. In general, integration with either timing controller 915 or display data generator 905 would be less costly than integration with column driver 930.

Using the structure and methods disclosed in FIGS. 5-8 and 9(*a*)-9(*c*), a display with switching element point inversion driving scheme can be implemented using integrated circuits that are designed to implement switching element row inversion driving scheme. In addition, using the structure and methods disclosed in FIGS. 5-8 and 9(*a*)-9(*c*), a display with switching element row inversion driving scheme can be implemented using integrated circuits that are designed to implement switching element point inversion driving scheme.

As shown in FIGS. 10 and 11, the overall polarity pattern of the color dots in FIG. 11 is the same as a display using switching element point inversion driving scheme (See FIG. 4(*b*)) even though display 1100 uses a switching element column inversion driving scheme. However, the power saving and cost reduction in using switching element column inversion drivers to implement switching element point inversion are less than the power saving and cost reduction in using switching element row inversion drivers to implement switching element point inversion.

Using the structure and methods disclosed in FIGS. 10 and 11, a display with switching element column inversion driving scheme can be implemented using integrated circuits that are designed to implement switching element point inversion driving scheme. In addition, using the same layouts and methods in FIGS. 10 and 11, we can use switching element column inversion drivers to implement switching element point inversion driving scheme.

The examples of the present invention described above use a vertical stripe color filter and/or delta color filters. However, one skilled in the art can easily adapt the principles of the present invention for use in displays having other types of color filters, such as, such the quad, triad, and horizontal stripe.

For example, FIG. 12 illustrates a small portion (6 pixels) of a display 1200 that uses the horizontal stripe color filter arrangement. Specifically, FIG. 12 illustrates pixels P(0, 0), P(1, 0), P(2, 0), P(3, 0), and P(4, 0), P(5, 0). Each pixel includes three color dots (CD_1, CD_2, and CD_3) and three transistors. The color dots in the pixels of display 1200 are arranged vertically rather than horizontally as was the case in display 400 (FIG. 4(*a*)). Furthermore, the color components of different pixels are aligned horizontally thus, display 1200 uses horizontal stripe color filter arrangement. FIG. 12 also includes source lines (S0, S1, S2, S3, S4, and S5) and gate lines (G0_1, G0_2, G0_3, and G1_1)). In general, a source line SX and gate line GY_Z is used for color dot CD_Z of pixel P(X,Y) (i.e. Xth pixel on row Y). The source terminal of a transistor is coupled to a source line; the gate terminal of the transistor is coupled to a gate line; and the drain terminal of the transistor is coupled to the electrode of a color dot. For clarity, transistors are labeled and referenced as transistor T(X, Y, Z), such that the source terminal of transistor T(X, Y, Z) is coupled to source line SX and the gate terminal of transistor T(X, Y, Z) is coupled to gate line GY_Z. In display 1200, the drain terminal of transistor T(X, Y, Z) is coupled to color dot CD_Z of pixel P(X,Y). Thus for example, Pixel P(1, 0) includes three color dots CD_1, CD_2, and CD_3, which are coupled to transistors T(1, 0, 1), T(1, 0, 2), T(1, 0, 3), respectively. The source terminals of transistors T(1, 0, 1), T(1, 0, 2), T(1, 0, 3) are coupled to source line S1; the gate terminals of transistors T(1, 0, 1), T(1, 0, 2), T(1, 0, 3) are coupled to gate lines G0_1, G0_2, and G0_3, respectively; and the drain terminals of transistors T(1, 0, 1), T(1, 0, 2), T(1, 0, 3) are coupled to color dots CD_1, CD_2, and CD_3, respectively, of pixel P(1, 0). For clarity, the area of each pixel is shaded; this shading is only for illustrative purposes in FIG. 12 and has no functional significance.

Each source line extends from the top of display 1200 to the bottom and controls all the pixels on one column of display 1200. Display 1200 has one source line for each column of pixels. Each gate line runs from the left side of display 1200 to the right side of display 1200. Display 1200 has three times the number of gate lines as the number of pixels on each row (i.e. one source line for each color dot of each pixel). During operation only one gate line is active at a time. All source lines are active at the same time and each source line provides display data to one transistor on the active row (as controlled by the active gate line).

Like displays using vertical strip color filters, displays using horizontal color strip filters can also use various switching element driving schemes are used. The three main switching element driving schemes are switching element point inversion driving scheme, switching element row inversion driving scheme, and switching element column inversion driving scheme. FIG. 12(*b*) illustrates a display 1210 having the same basic layout as display 1200. Display 1210 uses the switching element point inversion driving scheme. Specifically, in FIG. 12(*b*), a color dot CD_Z of pixel P(X, Y) has positive polarity (denoted with a "+") if X plus Y plus Z is an odd number and has negative polarity (denoted with a "−") if X plus Y plus Z is an even number. However in the next frame the polarities switch so that each color dot would have the opposite polarity.

In the switching element row inversion driving scheme, the switching elements on each row have the same polarity; however, each switching element in one row has the opposite polarity as compared to the polarity of switching elements in adjacent rows. FIG. 12(*c*) illustrates the switching element row inversion driving scheme using display 1220, which has the same basic layout as display 1200. Specifically in FIG. 12(*c*), a color dot CD_Z of pixel P(X,Y) has positive polarity if Y+Z is an odd number and has negative polarity if Y+Z is an even number. However, in the next frame the polarities switch so that each color dot would have the opposite polarity.

In the switching element column inversion driving scheme, the switching elements on each column have the same polarity; however, a switching element in one column has the opposite polarity as compared to the polarity of switching elements in adjacent columns. FIG. 12(*d*) illustrates the switching element column inversion driving scheme using a display 1230 having the same basic layout as display 1200. Specifically in FIG. 12(*d*), a color dot CD_Z of pixel P(X,Y) has positive polarity if X is an even number and negative polarity if X is an odd number. However, in the next frame the polarities switch so that each color dot would have the opposite polarity.

As explained above switching element point inversion driving scheme provides better picture quality but the drivers and various components to implement switching element point inversion costs significantly more the drivers and various components used to implement switching element row inversion driving scheme and switching element column inversion driving scheme. Thus, the present inventions implements switching element point inversion driving schemes using the lower cost drivers and components that are used in switching element row inversion driving schemes.

Figure 13:
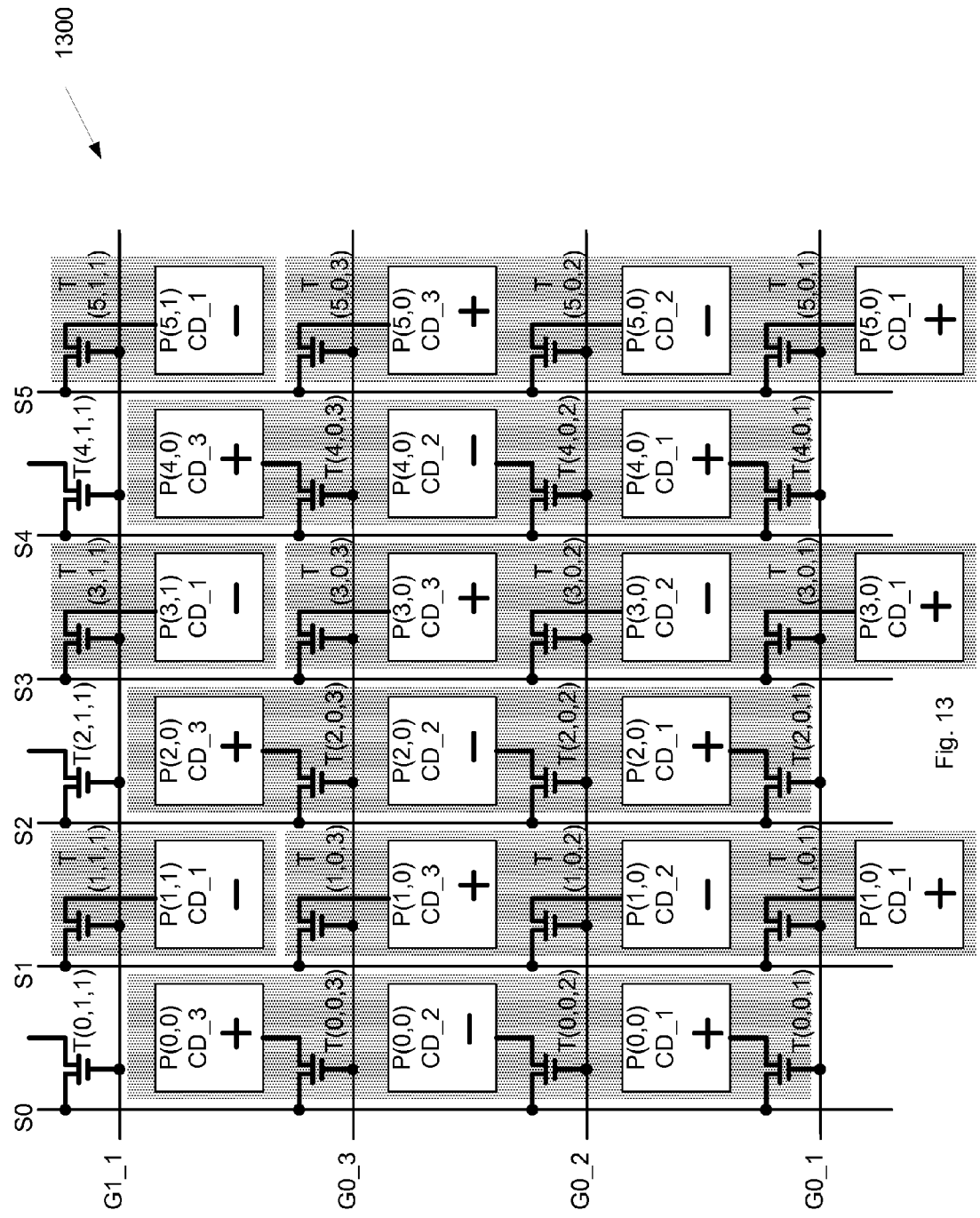
FIG. 13 is an illustration of a display using a horizontal stripe color filter arrangement in accordance with another embodiment of the present invention.

FIG. 13 illustrates a small portion (6 pixels) of a display 1300 in accordance with one embodiment of the present invention. Specifically, FIG. 13 illustrates pixels P(0, 0), P(1, 0), P(2, 0), P(3, 0), P(4, 0), P(5, 0) and portions of pixel P(1, 1) and P(3, 1). Each pixel includes three color dots (CD_1, CD_2, and CD_3) and three transistors. FIG. 13 also includes source lines (S0, S1, S2, S3, S4, and S5) and gate lines (G0_1, G0_2, G0_3, and G1_1). Each Gate line extends from the left side of display 1300 to the right side of display 1300. Unlike displays 1200-1220, in which each gate line controls only one row of color dots, gate lines in display 1300 control color dots on more than one row as explained below. Each source line runs from the top to the bottom of display 1300. Display 1300 has three times the number of gate lines as the number of pixels on each column (i.e. one gate line for each color dot of each pixel). During operation only one gate line is active at a time. All transistors in the active row are rendered conductive by a positive gate impulse from the active gate line. Transistors in other rows are blocked by negative level of voltage applied on the non-active gate lines. All source lines are active at the same time and each source line provides display data to one transistor on the active row (as controlled by the active gate line). The voltage charges the liquid crystal capacitor to a desired gray scale level (color is provided by color masks).

In display 1300, the source terminal of a transistor is coupled to a source line; the gate terminal of the transistor is coupled to a gate line; and the drain terminal of the transistor is coupled to the electrode of a color dot. For clarity, transistors are labeled and referenced as transistor T(X, Y, Z), such that the source terminal of transistor T(X, Y, Z) is coupled to source line SX and the gate terminal of transistor T(X, Y, Z) is coupled to gate line GY_Z. The primary difference between display 1300 and displays 1200-1230 is that transistors coupled to the same gate line control color dots on different rows in display 1300. Thus for example transistor T(0, 0, 2) controls a color dot on the row of color dots above gate line G0_2 and transistor T(1, 0, 2) controls a color dot on the row of color dots below gate line G0_2. In general for display 1300, a transistor T(X, Y, Z) controls the color dot above transistor T(X, Y, Z) when X plus Y plus Z is an even number and controls the color dot below transistor T(X, Y, Z) when X plus Y plus Z is an odd number. Thus when gate line G0_2 is active, every other color dot on the row of color dots above gate line G0_2 beginning with the first color dot on the left and every other color dot on the row of color dot below gate line G0_2 beginning with the second color dot from the left are active. As explained above, when using switching element row inversion drivers, all of the color dots controlled by transistors coupled to the same gate line have the same polarity. Thus as shown in FIG. 13, the overall polarity pattern of the color dots in FIG. 13 is the same as a display using switching element point inversion driving scheme (See FIG. 12(b)).

Due to the change in the connection of the transistors in display 1300, pixels in adjacent columns display 1300 are not aligned. For clarity, the area of each pixel in display 1300 is shaded; this shading is only for illustrative purposes in display 1300 and has no functional significance. In display 1300 Pixel P(0, 0) includes three color dots CD_1, CD_2, and CD_3, which are coupled to transistors T(0, 0, 1), T(0, 0, 2), T(0, 0, 3), respectively. Pixel P(1, 0) includes three color dots CD_1, CD_2, and CD_3, which are coupled to transistors T(1, 0, 1), T(1, 0, 2), T(1, 0, 3), respectively. However, Pixel P(0, 0) and pixel P(1, 0) are not aligned vertically. Specifically, pixel P(1, 0) is one color dot height lower than pixel P(0, 0). In general for display 1300, even numbered columns are offset by more than one color dot height from odd numbered columns. This vertical offset between adjacent columns prevents horizontal alignment of the color components of adjacent pixels. Thus, display 1300 uses a delta type color filter arrangement rather than a horizontal stripe color filter arrangement.

Figure 14:
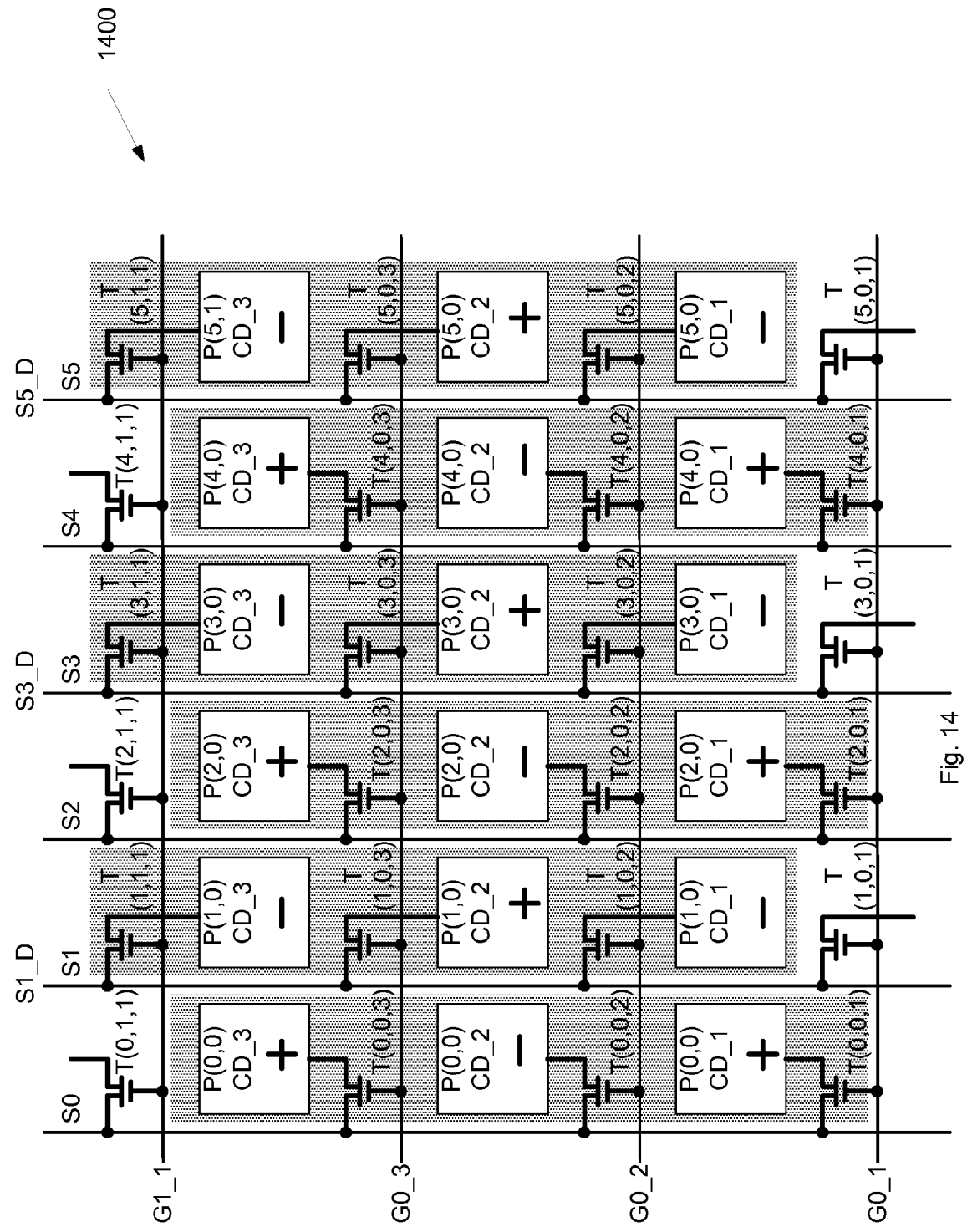
FIG. 14 is an illustration of a display using a horizontal stripe color filter arrangement in accordance with another embodiment of the present invention.

The novel driving scheme described above (illustrated in FIGS. 6, 7, 8 and 9(a)-9(c) can be used to realign the pixels and allow a horizontal stripe color filter arrangement. FIG. 14 illustrates a display 1400 using the novel driving scheme in accordance with one embodiment of the present invention. FIG. 14 is similar to FIG. 13 except that signals applied to the odd numbered source lines are delayed. Thus the description is not repeated. Specifically, delayed source signal S1_D, S3_D, and S5_D are applied to source lines S1, S3, and S5, respectively. In one embodiment of the present invention the delayed source lines are generated using delay circuitry in the timing controller. In another embodiment of the present invention a separate timing control delay unit is used with source signals S1, S3 and S5 (as used in FIG. 13). The delay period is equal to one row refresh period. As explained in more detail above, conventional components can be used with a timing control delay unit or minor modifications can be made to conventional components to generate the delayed source lines.

As illustrated in FIG. 14, the color components of the pixels are realigned when using delayed source signals. In particular, 6 pixels (P(0, 0), P(1, 0), P(2, 0), P(3, 0), P(4, 0), and P(5, 0) are illustrated in display 1400. For clarity, the area of each pixel is shaded; this shading is only for illustrative purposes in FIG. 14 and has no functional significance. Thus, the pixels in adjacent columns are vertically aligned in display 1400. Furthermore, the color components if pixels on the same row are aligned. Therefore, display 1400 can use horizontal strip color filter arrangement.

FIG. 14 is an illustration of a display to implement the switching element point inversion driving scheme using the integrated circuits that are designed to implement switching element row inversion driving scheme. As explained above for the display 500 in FIG. 5, the overall polarity pattern of the color dots in FIG. 14 is the same as a display using switching element point inversion driving scheme.

For the implement of switching element point inversion driving scheme using the integrated circuits that are designed to implement switching element row inversion driving scheme, the layout in FIG. 13 changes from the color stripe arrangement to a delta type color layout. For displays using the stripe pattern color arrangement, embodiments of the present invention include a novel driving scheme to enhance the color alignment. The novel driving scheme delays source signal to realign color components.

Using the structure and methods disclosed in FIGS. 13 and 14, a display with switching element point inversion driving scheme can be implemented using integrated circuits that are designed to implement switching element row inversion driving scheme. Furthermore, the display can use horizontal stripe color filter arrangement. In addition, using the structure and methods disclosed in FIGS. 13 and 14, a display with switching element row inversion driving scheme can be implemented using integrated circuits that are designed to implement switching element point inversion driving scheme for the horizontal stripe color filter arrangement.

Using the structure and methods disclosed in this invention, a display with switching element column inversion driving scheme can be implemented using integrated circuits that are designed to implement switching element row inversion driving scheme. In addition, a display with switching element row inversion driving scheme can be implemented using integrated circuits that are designed to implement switching element column inversion driving scheme.

Furthermore, the principles of the present invention are applicable to all type of Liquid Crystal Displays, including the conventional twisted nematic LCDs, vertical alignment LCDs, multi-domain vertical alignment LCDs, in-plane switching LCDs, supertwisted nematic LCDs, electrically controlled birefringence LCDs, optically controlled birefringence LCD, also cholesteric, smectic and bistable LCDS. In addition the present invention is also applicable to monochromatic display with only one color component, two color components, and four color components (typically red, green, blue and white), and other multiple color components.

In the various embodiments of the present invention, novel structures and methods have been described for creating achieving switching element point inversion displays without the high cost and high power consumption of convention switching element point inversion displays. The various embodiments of the structures and methods of this invention that are described above are illustrative only of the principles of this invention and are not intended to limit the scope of the invention to the particular embodiments described. For example, in view of this disclosure those skilled in the art can define other row drivers, column drivers, timing controllers, timing control delay units, display data generators, v-com generation circuits, pixel definitions, pixel designs, polarities, electrodes, substrates, films, and so forth, and use these alternative features to create a method, or system according to the principles of this invention. Thus, the invention is limited only by the following claims.

What is claimed is:

1. A display comprising:
   a first control line;
   a first color dot on a first side of the control line;
   a second color dot on a second side of the control line;
   a first switching element coupled to the first control line and the first color dot; wherein the first switching element controls the first color dot;
   a second switching element coupled to the first control line and the second color dot; wherein the second switching element controls the second color dot;
   a second control line;
   a third color dot; wherein the first color dot and the third color dot are in a first row of color dots;
   a third switching element coupled to the third color dot and the second control line;
   a third control line coupled to the first switching element;
   a fourth control line coupled to the second switching element and the third switching element;
   a fourth color dot, wherein the fourth color dot is in the first row of color dots; and
   a fourth switching element coupled to the first control line and the fourth color dot.

2. The display of claim 1 wherein the first switching element is a first thin-film-transistor having a gate terminal coupled to the first control line, a source terminal coupled to the third control line, and a drain terminal coupled to the first color dot.

3. The display of claim 2, wherein the second switching element is a second thin-film-transistor having a gate terminal coupled to the first control line, a source terminal coupled to the fourth control line, and a drain terminal coupled to the second color dot.

4. The display of claim 1, wherein
   the first color dot is part of a first color component of a first pixel;
   the second color dot is part of a second color component of the first pixel; and
   the third color dot is part of a first color component of a second pixel.

5. The display of claim 1 further comprising:
   a fifth color dot; and
   a fifth switching element coupled to the second control line, the third control line and the fifth color dot.

6. The display of claim 1, wherein the first color dot is part of a first pixel and the third color dot is part of a second pixel.

7. The display of claim 1, wherein
   the first switching element is a transistor having a gate terminal coupled to the first control line, a source terminal coupled to the third control line, and a drain terminal coupled to the first color dot;
   the second switching element is a transistor having a gate terminal coupled to the first control line, a source terminal coupled to the fourth control line, and a drain terminal coupled to the second color dot; and
   the third switching element is a transistor having a gate terminal coupled to the second control line, a source terminal coupled to the fourth control line, and a drain terminal coupled to the third color dot.

8. The display of claim 1, wherein the first color dot, the second color dot and the fourth color dot are part of a first pixel.

9. The display of claim 1, further comprising:
   a fifth control line;
   a fifth color dot, wherein the second color dot and the fifth color dot are in a second row of color dots;
   a fifth switching element coupled to the fifth control line, the third control line; and the fifth color dot.

10. The display of claim 9, further comprising:
    a sixth color dot, wherein the sixth color dot is in the second row of color dots;
    a sixth switching element coupled to the fifth control line and the sixth color dot; and
    a sixth control line coupled to the sixth switching element and the fourth switching element.

11. The display of claim 10, wherein the first color dot, the second color dot and the fourth color dot are part of a first pixel and the second color dot, the fifth color dot, and the sixth color dot are part of a second pixel.

12. The display of claim 10, wherein the first color dot and the fifth color dot are part of a first pixel and the third color dot and the $2^{nd}$ color dot are part of a second pixel.

13. The display of claim 1, wherein the first control line is a gate line.

14. The display of claim 1, wherein the first control line is a source line.

* * * * *